US011718149B2

(12) United States Patent
Ide et al.

(10) Patent No.: US 11,718,149 B2
(45) Date of Patent: Aug. 8, 2023

(54) VEHICULAR AIR CONDITIONING UNIT

(71) Applicant: DENSO CORPORATION, Kariya (JP)

(72) Inventors: Shinji Ide, Kariya (JP); Ryo Kobayashi, Kariya (JP); Yasue Yonezu, Kariya (JP); Ayumi Kawasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 352 days.

(21) Appl. No.: 16/838,246

(22) Filed: Apr. 2, 2020

(65) Prior Publication Data

US 2020/0223281 A1 Jul. 16, 2020

Related U.S. Application Data

(63) Continuation of application No. PCT/JP2018/034877, filed on Sep. 20, 2018.

(30) Foreign Application Priority Data

Oct. 5, 2017 (JP) .................................. 2017-194960
Aug. 21, 2018 (JP) .................................. 2018-154838

(51) Int. Cl.
 B60H 1/00 (2006.01)
(52) U.S. Cl.
 CPC ................................ B60H 1/00521 (2013.01)
(58) Field of Classification Search
 CPC ............ B60H 1/00521; B60H 1/00528; B60H 1/00535; B60H 1/00542; B60H 1/00514; B60H 2001/00078; B60H 2001/2281

(Continued)

(56) References Cited

U.S. PATENT DOCUMENTS

| 2004/0107723 A1 | 6/2004 | Lee et al. |
| 2015/0111484 A1* | 4/2015 | Son .......................... F24F 13/20 |
| | | 454/261 |
| 2019/0255905 A1 | 8/2019 | Tsumagari et al. |

FOREIGN PATENT DOCUMENTS

| DE | 102009037920 A1 | 2/2011 | |
| EP | 1769952 B1 * | 3/2010 | ......... B60H 1/00471 |

(Continued)

OTHER PUBLICATIONS

Battenberg, Christian, WO2010003580 Translation.pdf, "Ventilation module for vehicle roof-mounted systems", Jan. 2010, pp. 1-12.*

(Continued)

*Primary Examiner* — Avinash A Savani
*Assistant Examiner* — Ryan L Faulkner
(74) *Attorney, Agent, or Firm* — Harness, Dickey & Pierce, P.L.C.

(57) ABSTRACT

A vehicular air conditioning unit includes an air-conditioning case and a blower. The blower includes a blower fan accommodated in the air-conditioning case and configured to rotate about a fan axis to cause the air to flow through the case passage, and a blower motor accommodated in the air-conditioning case and configured to rotate the blower fan. The air-conditioning case includes a case body having a case opening hole that is located outward of the blower in a radial direction of the fan axis and opens in the radial direction, and an opening hole cover fixed to the case body to close the case opening hole. The opening hole cover is detachable from the case body. The case opening hole has a size that allows the blower to pass through the case opening hole when the blower is taken out from the air-conditioning case.

10 Claims, 25 Drawing Sheets

(58) Field of Classification Search
USPC .......................................................... 454/338
See application file for complete search history.

(56) References Cited

FOREIGN PATENT DOCUMENTS

| JP | S63026422 U | 2/1988 | |
|---|---|---|---|
| JP | H04126000 A | 4/1992 | |
| JP | H09-273469 A | 10/1997 | |
| JP | 2002051852 A | 2/2002 | |
| JP | 2005014703 A | 1/2005 | |
| JP | 2015182566 A | 10/2015 | |
| KR | 20080076190 A * | 8/2008 | ......... B60H 1/00528 |
| KR | 20140112753 A * | 8/2014 | ......... B60H 1/00521 |
| WO | WO-2010003580 A1 * | 1/2010 | ......... B60H 1/00457 |
| WO | WO-2018083940 A | 5/2018 | |

OTHER PUBLICATIONS

Lee, Nam, KR20080076190 Translation.pdf, "Center mounting type air conditioner for vehicle", Aug. 2008, pp. 1-10.*
Cho, Jung, KR20140112753 Translation.pdf, "Air conditioning system for automotive vehicles", Aug. 2014, pp. 1-8.*

* cited by examiner

VEHICULAR AIR CONDITIONING UNIT

CROSS REFERENCE TO RELATED APPLICATION

The present application is a continuation application of International Patent Application No. PCT/JP2018/034877 filed on Sep. 20, 2018, which designated the U.S. and claims the benefit of priority from Japanese Patent Application No. 2017-194960 filed on Oct. 5, 2017, and Japanese Patent Application No. 2018-154838 filed on Aug. 21, 2018. The entire disclosures of all of the above applications are incorporated herein by reference.

TECHNICAL FIELD

The present disclosure relates to a vehicular air-conditioning unit.

BACKGROUND

Generally, a vehicular air-conditioning unit includes an air-conditioning case defining therein a case passage through which air flows; and a blower that has a blower motor and a blower fan that is a centrifugal multi-blade fan.

SUMMARY

A vehicular air conditioning unit according to an aspect includes: an air-conditioning case that defines therein a case passage through which an air flows; and a blower that has a blower fan accommodated in the air-conditioning case and configured to rotate about a fan axis to cause the air to flow through the case passage, and a blower motor accommodated in the air-conditioning case and configured to rotate the blower fan. The air-conditioning case includes a case body having a case opening hole that is located outward of the blower in a radial direction of the fan axis and opens in the radial direction, and an opening hole cover fixed to the case body to close the case opening hole. The opening hole cover is detachable from the case body. The case opening hole has a size that allows the blower to pass through the case opening hole when the blower is taken out from the air-conditioning case.

EMBODIMENTS

Figure 1:
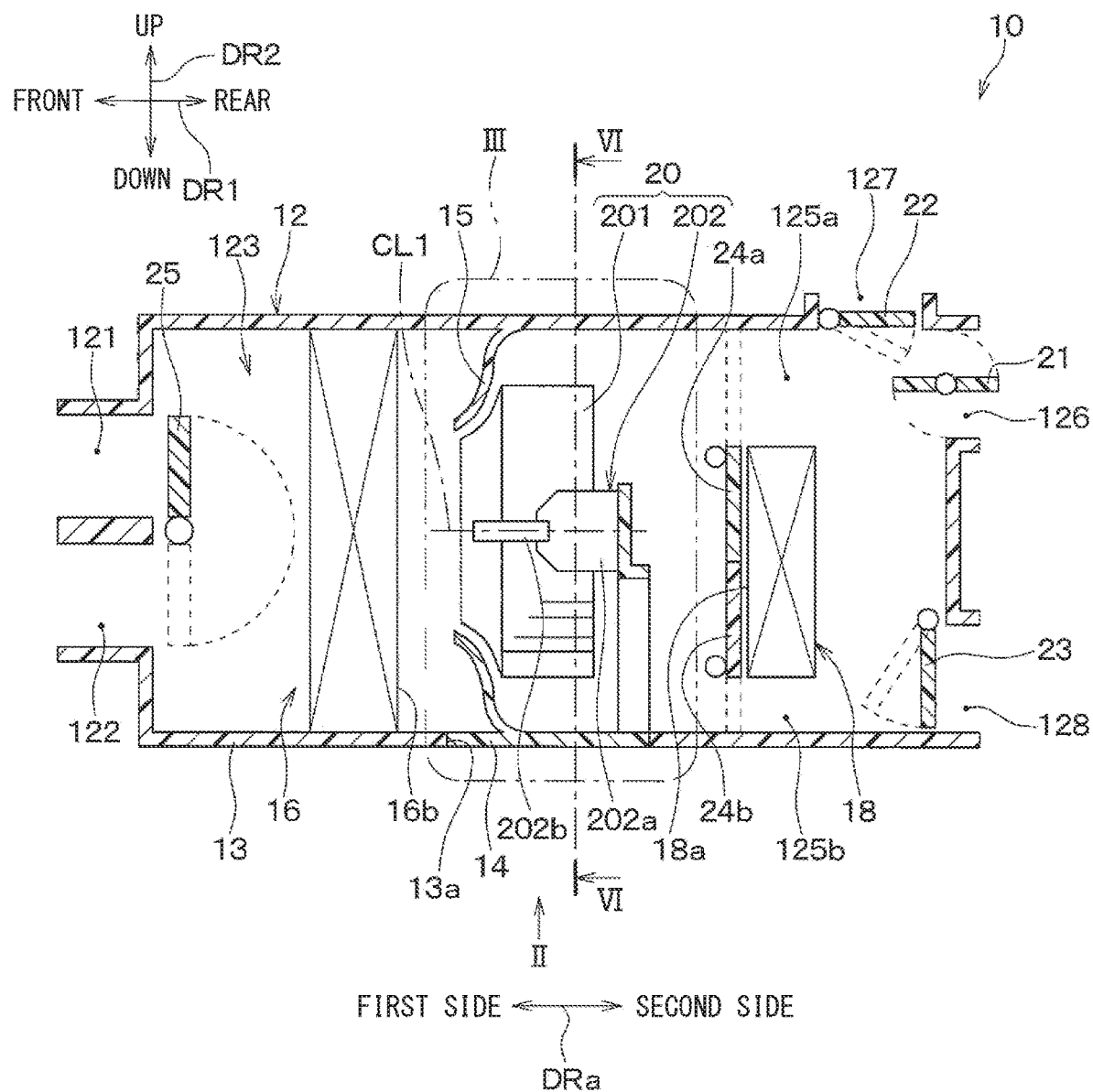
FIG. 1 is a schematic cross-sectional view showing a schematic configuration of a vehicular air-conditioning unit according to at least one embodiment.

In a vehicular air-conditioning unit, an object that can be an obstacle when taking out the blower from the air-conditioning case may not be provided on one side of the blower fan in an axial direction of a fan axis of the blower fan. The one side is opposite side from a side from which the air is drawn by the blower fan.

When an object that can be an obstacle when taking out the blower from the air-conditioning case is not provided on the one side in the axial direction of the fan axis in the vehicular air-conditioning unit, the blower can be replaced if the blower can be moved toward the one side in the axial direction. However, depending on the vehicular air-conditioning unit, objects that can be obstacles when taking out the blower from the air-conditioning case may exist on both sides in the axial direction of the fan axis due to various restrictions. In such a case, the blower cannot be pulled out from the air-conditioning case in the axial direction of the fan axis. As a result of detailed studies by the inventors, the problems as described above have been found.

Hereinafter, each embodiment will be described with reference to the drawings. In the following embodiments, the same reference numeral is given to the same or equivalent parts in the drawings.

First Embodiment

Figure 2:
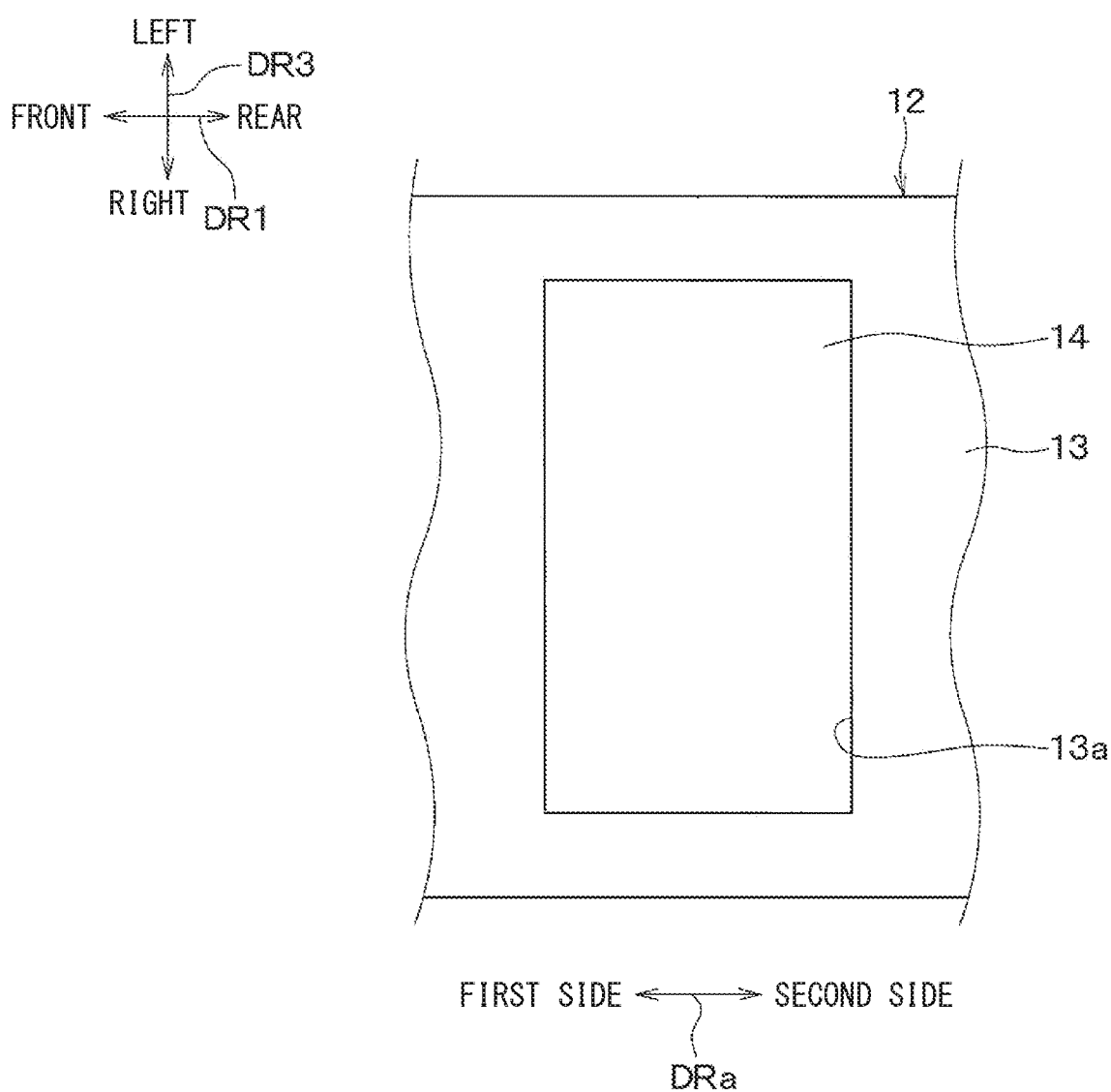
FIG. 2 is a view in the direction of arrow II in FIG. 1.

As shown in FIG. 1, a vehicular air-conditioning unit 10 of the present embodiment includes an air-conditioning case 12, an evaporator 16, a heater core 18, a blower 20, and doors 21, 22, 23, 24a, 24b, 25. The vehicular air-conditioning unit 10 is arranged, for example, inside an instrument panel provided at the foremost portion in a passenger compartment. Arrows DR1, DR2 in FIG. 1 and an arrow DR3 in FIG. 2 represent directions with respect to the vehicle on which the vehicular air-conditioning unit 10 is mounted. That is, the arrow DR1 in FIG. 1 represents a front-rear direction DR1 of the vehicle, and the arrow DR2 represents an up-down direction DR2 of the vehicle. In FIG. 2, the arrow DR3 represents a left-right direction DR3 of the vehicle, i.e. a width direction DR3 of the vehicle. The directions DR1, DR2, DR3 intersect with each other. Specifically, the directions DR1, DR2, DR3 are orthogonal to each other.

The air-conditioning case 12 is a member forming an outer shell of the vehicular air-conditioning unit 10 and formed of a resin. As shown in FIG. 1, the air-conditioning case 12 has an outside air introduction port 121, an inside air introduction port 122, and air outlets 126, 127, 128 through which the air is discharged from the air-conditioning case 12. The air-conditioning case 12 defines therein a case passage 123 through which the air flows from one or both of the outside air introduction port 121 and the inside air introduction port 122 to the air outlets 126, 127, 128. The case passage 123 extends in the front-rear direction DR1 of the vehicle.

The outside air introduction port 121 is an introduction port for introducing outside air, which is air outside the passenger compartment, into the case passage 123. The inside air introduction port 122 is an introduction port for introducing inside air, which is air inside the passenger compartment, into the case passage 123. The outside air or the inside air is introduced into the air-conditioning case 12 by the blower 20.

The outside air introduction port 121 and the inside air introduction port 122 are opened and closed by an inside-outside air switching door 25. The air introduced from one or both of the outside air introduction port 121 and the inside air introduction port 122 flows into the evaporator 16.

The evaporator 16 is a cooling heat exchanger that cools the air passing through the evaporator 16. In short, the evaporator 16 is a cooler.

The evaporator 16 is accommodated in the air-conditioning case 12. That is, the evaporator 16 is disposed in the case passage 123 so that the outside air and the inside air introduced into the case passage 123 flows through the evaporator 16. The evaporator 16, together with a compressor, a condenser, and an expansion valve (not shown), constitutes a known refrigeration cycle device configured to circulate the refrigerant. The evaporator 16 exchanges heat between the air passing through the evaporator 16 and the refrigerant, and evaporates the refrigerant and cools the air by the heat exchange.

The blower 20 has a blower fan 201, and a blower motor 202 that rotates the blower fan 201 about a fan axis CL1. The blower fan 201 and the blower motor 202 are disposed in the case passage 123. That is, the blower fan 201 and the blower motor 202 are accommodated in the air-conditioning case 12.

The blower fan 201 causes the air to flow in the case passage 123 by rotating about the fan axis CL1. Specifically, the blower fan 201 of the present embodiment is a centrifugal fan. Accordingly, the blower fan 201 draws air from one side in the axial direction DRa of the fan axis CL1 by rotating about the fan axis CL1, and blows the drawn air outward in a radial direction of the blower fan 201. The air blown outward in the radial direction is guided by the air-conditioning case 12 toward a downstream side of the case passage 123 (for example, toward a rear side of the vehicle in FIG. 1).

The blower motor 202 has a stator 202a that is a non-rotatable portion, and a motor shaft 202b rotatable about the fan axis CL1. The blower fan 201 is connected to the motor shaft 202b so as not to rotate relatively.

Since the blower fan 201 is arranged coaxially with the blower motor 202, the fan axis CL1 is a rotation center of the blower fan 201 and the blower motor 202. In the present embodiment, the axial direction DRa of the fan axis CL1 coincides with the front-rear direction DR1 of the vehicle. The axial direction DRa of the fan axis CL1 is the same as the axial direction DRa of the blower fan 201, and the axial direction DRa of the fan axis CL1 may be referred to as a fan axial direction DRa. In addition, the radial direction of the blower fan 201 is a radial direction of the fan axis CL1. The radial direction of the fan axis CL1 is also referred to as a fan radial direction.

The blower 20 has a so-called suction-type layout in which the blower fan 201 is located downstream of the evaporator 16. The blower 20 is arranged so that one side in the fan axial direction DRa, which is an air suction side of the blower fan 201, faces an air outflow surface 16b of the evaporator 16. That is, the blower fan 201 is arranged such that the other side opposite from the one side in the fan axial direction DRa faces an air flow downstream side in the case passage 123.

The heater core 18 is a heater that heats air passing through the heater core 18 in the air flowing through the case passage 123. The heater core 18 is located downstream of the blower fan 201 in the case passage 123. The heater core 18 is arranged at a center part in the case passage 123 in the up-down direction DR2 of the vehicle. Accordingly, the blower 20 is arranged such that the other side opposite from the air suction side of the blower fan 201 in the fan axial direction DRa faces an air inflow surface 18a of the heater core 18.

In the air-conditioning case 12, an upper bypass passage 125a is defined above the heater core 18, and a lower bypass passage 125b is defined below the heater core 18. Both of the upper bypass passage 125a and the lower bypass passage 125b are included in the case passage 123 and allow the air to flow in parallel to the heater core 18. That is, the upper bypass passage 125a and the lower bypass passage 125b are bypass passages through which the air bypasses the heater core 18. In other words, both of the upper bypass passage 125a and the lower bypass passage 125b are non-heating passages in which the heater core 18 is not provided.

A first air mix door 24a and a second air mix door 24b are provided on an air flow upstream side with respect to the heater core 18 in the case passage 123. The first air mix door 24a and the second air mix door 24b are located downstream of the blower 20.

The first air mix door 24a is arranged in the upper bypass passage 125a and opens and closes the upper bypass passage 125a. The first air mix door 24a is a slide-type door mechanism, and is slid by an electric actuator (not shown).

The first air mix door 24a adjusts an air volume ratio between an air volume passing through the heater core 18 and an air volume passing through the upper bypass passage 125a according to a slide position thereof.

The second air mix door 24b is disposed in the lower bypass passage 125b and opens and closes the lower bypass passage 125b. The second air mix door 24b is a slide-type door mechanism, and is slid by an electric actuator (not shown).

The second air mix door 24b adjusts an air volume ratio between an air volume passing through the heater core 18 and an air volume passing through the lower bypass passage 124a according to a slide position thereof.

The air conditioning case 12 has a face air outlet 126, a defroster air outlet 127, and a foot air outlet 128 through which the air flows out of the air-conditioning case 12. The face air outlet 126, the defroster air outlet 127, and the foot air outlet 128 are connected to the case passage 123 on an air flow downstream side with respect to the heater core 18 and the bypass passages 125a and 125b.

The air flowing through the face air outlet 126 is guided through a duct (not shown), and is blown out toward the face or the chest of an occupant seated on a front seat in the passenger compartment. The air flowing through the defroster air outlet 127 is guided through a duct (not shown), and is blown out toward a windshield in the passenger compartment of the vehicle. The air flowing through the foot air outlet 128 is guided through a duct (not shown), and is blown out toward the feet of the occupant seated on the front seat in the passenger compartment.

In addition, the face air outlet 126 is provided with a face door 21, and the face door 21 opens and closes the face air outlet 126. The defroster air outlet 127 is provided with a defroster door 22, and the defroster door 22 opens and closes the defroster air outlet 127. The foot air outlet 128 is provided with a foot door 23, and the foot door 23 opens and closes the foot air outlet 128.

On an air flow downstream side of the heater core 18 in the case passage 123, warm air passing through the heater core 18 and cool air passing through the upper bypass passage 125a are mixed with each other. The mixed air is blown out mainly from an opened one of the face air outlet 126 and the defroster air outlet 127 into the passenger compartment.

In addition, on the air flow downstream side of the heater core 18, warm air passing through the heater core 18 and cool air passing through the lower bypass passage 125b are mixed with each other. The mixed air is blown out mainly from the foot air outlet 128 into the passenger compartment when the foot air outlet 128 is open.

Figure 3:
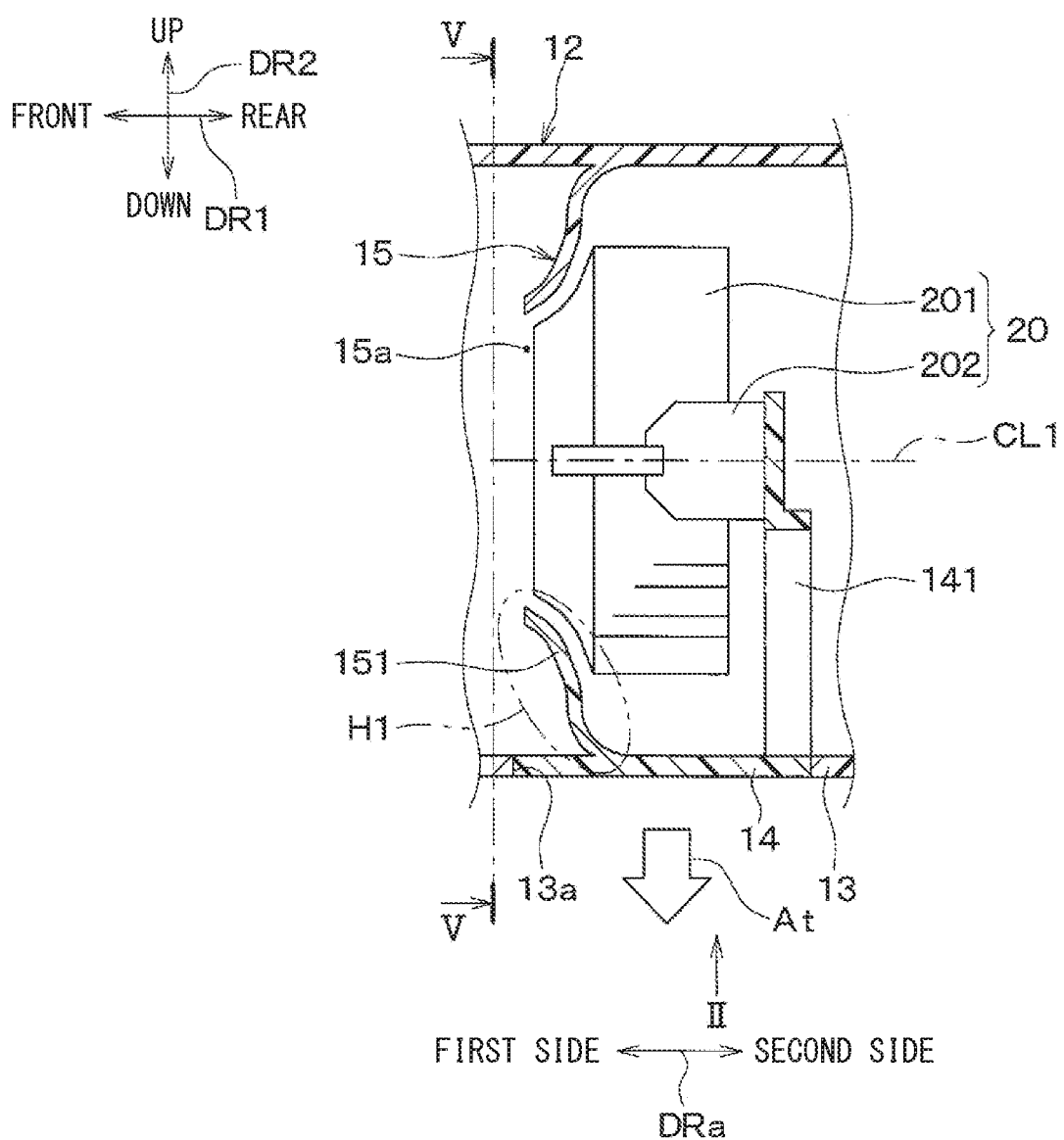
FIG. 3 is an enlarged view of III part of FIG. 1.

As shown in FIGS. 1 to 3, the air-conditioning case 12 includes a case body 13 having a case opening hole 13a, and an opening hole cover 14. The case body 13 is a part of an outer wall of the air-conditioning case 12 excluding the opening hole cover 14. FIG. 2 is a diagram viewed along an arrow II of FIG. 1 and also is a diagram viewed along an arrow II of FIG. 3.

The case opening hole 13a is a work opening hole for taking out the blower 20 from the air-conditioning case 12 when replacing the blower 20. Specifically, the case opening hole 13a is located outward of the blower 20 in the fan radial direction and opens in the radial direction. For example, the case opening hole 13a of the present embodiment is located below the blower 20 and opens downward.

The opening hole cover 14 is fixed to the case body 13 and closes the case opening hole 13a. Specifically, the opening hole cover 14 has a packing, for example, and closes the case opening hole 13a such that the air in the case passage does not leak from the case opening hole 13a.

Since the case opening hole 13a needs to be opened when the blower 20 is replaced, the opening hole cover 14 is configured to be removable from the case body 13. For example, the opening hole cover 14 is fixed to the case body 13 by snap-fit or screwing, and can be removed from the case body 13 by disconnecting the engagement edge of the snap-fit or unscrewing the screw. The opening hole cover 14 is detachable from the case body 13. That is, the opening hole cover 14 can be detached from the case body 13 by doing some actions to the fixation member fixing the opening hole cover 14 to the case body 13, such as the engagement edge and the screw.

As shown in FIGS. 1, 3, the opening hole cover 14 is connected to the blower 20. Specifically, the air-conditioning case 12 has a motor support portion 141 that is fixed to the opening hole cover 14 and is disposed in the air-conditioning case 12. The stator 202a of the blower motor 202 is fixed to the motor support portion 141.

For example, the opening hole cover 14 and the motor support portion 141 are integrally formed as a single resin mold. The motor support portion 141 has a rib-shaped portion, for example, so as not to interfere with the flow of the air blown out from the blower fan 201.

The blower 20 is removable from the case body 13 together with the opening hole cover 14. For example, the blower 20 is not directly fixed to the case body 13 but is indirectly fixed to the case body 13 through the opening hole cover 14. That is, since the opening hole cover 14 is fixed to the case body 13, the blower 20 is positioned at a predetermined position in the air-conditioning case 12.

Accordingly, the blower 20 is removed from the case body 13 at the same time when the opening hole cover 14 is detached from the case body 13. Further, the blower 20 is fixed to the case body 13 while the opening hole cover 14 is fixed to the case body 13. In the present embodiment, the opening hole cover 14 and the blower 20 are removed from the case body 13 in the fan radial direction (specifically, downward) as indicated by an arrow At in FIG. 3.

As described above, the case opening hole 13a is a work opening hole for taking out the blower 20 from the air-conditioning case 12, the case opening hole 13a is large enough that the blower 20 passes through the case opening hole 13a when taking out the blower 20 from the air-conditioning case 12.

Figure 4:
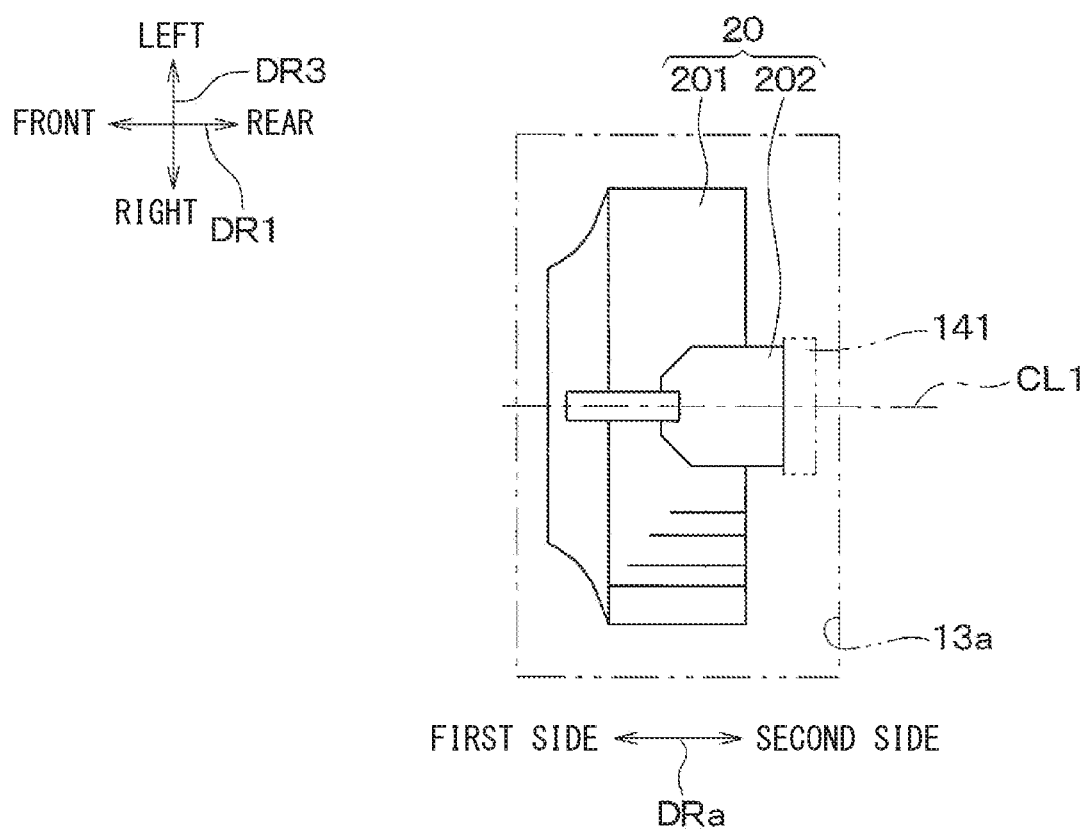
FIG. 4 is a diagram illustrating a blower of at least one embodiment projected in a fan radial direction toward a case opening hole (specifically, downward), and illustrating the case opening hole and a motor support portion by a dot-dot dash line.

Specifically, a projected area of the blower 20 projected toward the case opening hole 13a in the fan radial direction (specifically, downward) is smaller than the case opening hole 13a as shown in FIG. 4. A projected area of the motor support portion 141 is smaller than the case opening hole 13a as well as the projected area of the blower 20. Accordingly, the case opening hole 13a is large enough that the blower 20 passes therethrough when the blower 20 is taken out from the air-conditioning case 12. In FIG. 4, the case opening hole 13a and the motor support portion 141 are illustrated by a dot-dot dash line.

Figure 5:
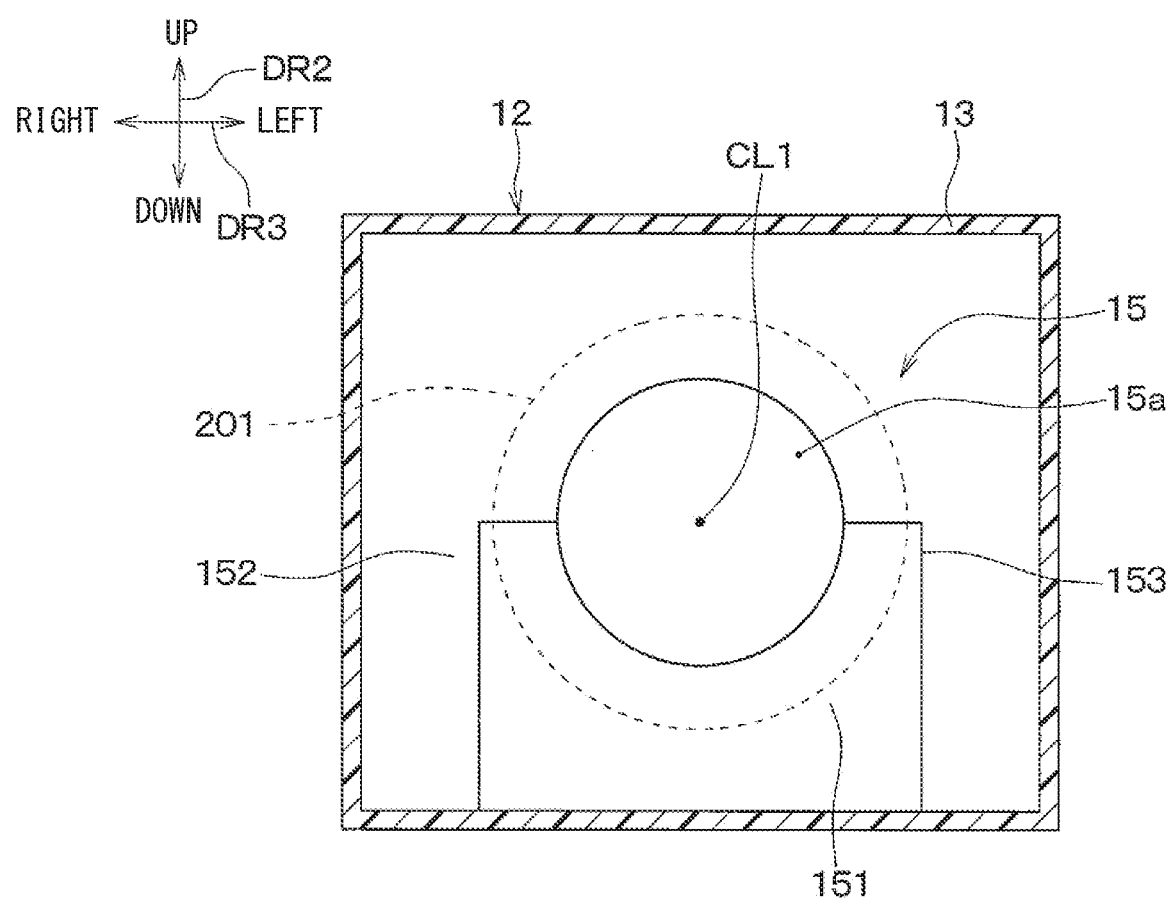
FIG. 5 is a cross-sectional view taken along line V-V of FIG. 3.
Figure 6:
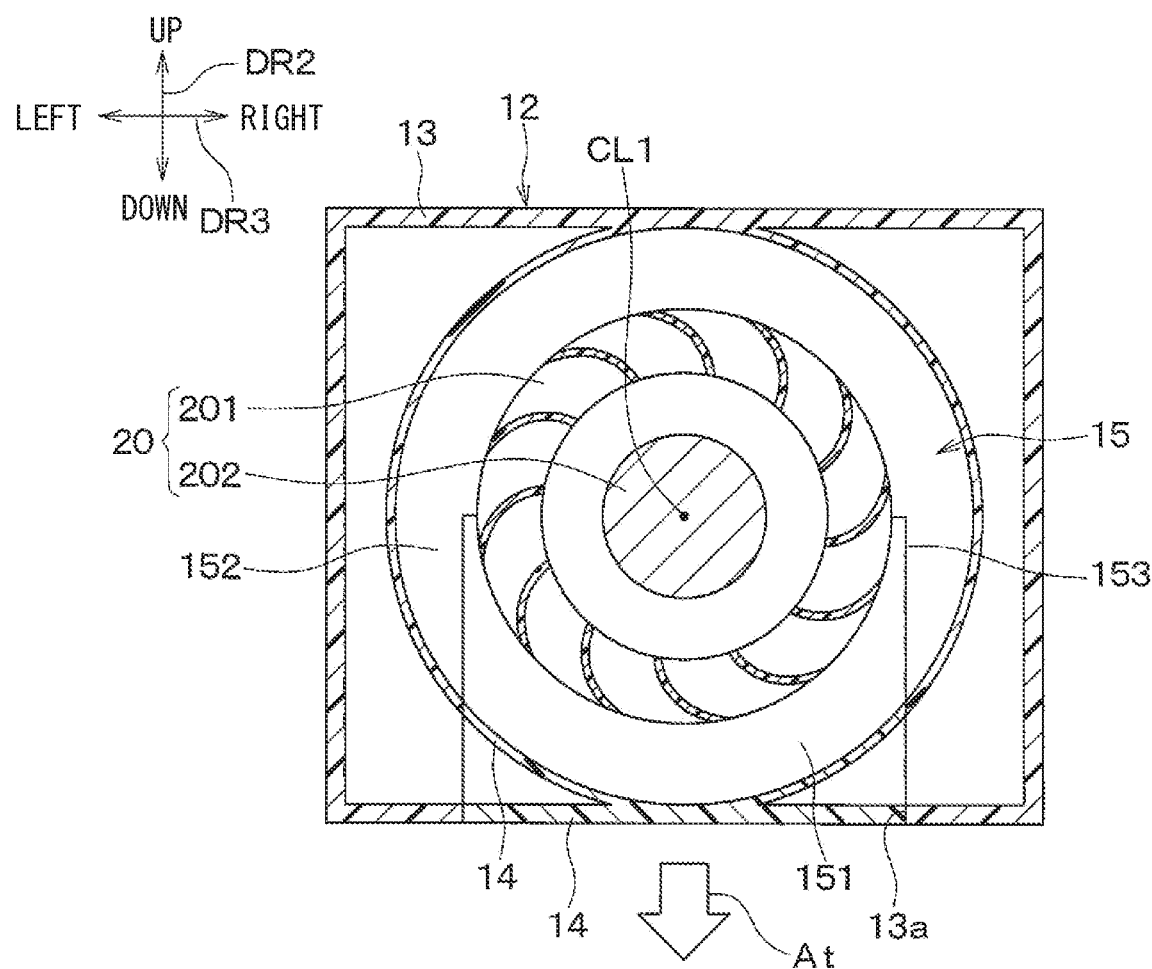
FIG. 6 is a cross-sectional view taken along line VI-VI of FIG. 1.

Since the blower 20 is a centrifugal blower, the air-conditioning case 12 has therein a fan cover 15 as shown in FIGS. 3, 5, 6. The fan cover 15 covers the blower fan 201 on one side of the blower fan 201 in the fan axial direction DRa. Further, the fan cover 15 defines a fan intake air hole 15a through which the air drawn by the blower fan 201 flows. A part of the fan cover 15 defining the fan intake air hole 15a has a bell mouth shape to guide the air toward the fan intake air hole 15a.

The fan cover 15 has a detachable portion 151. The detachable portion 151 is fixed to the opening hole cover 14, and detachable from the case body 13 together with the opening hole cover 14. For example, the detachable portion 151 is integrally formed with the opening hole cover 14 and accordingly fixed to the opening hole cover 14.

The detachable portion 151 is a separated component separated from a non-detachable portion 152 that is remaining parts of the fan cover 15. Since the opening hole cover 14 is fixed to the case body 13, the detachable portion 151 is joined to the non-detachable portion 152. That is, the detachable portion 151 is detached from the non-detachable portion 152 at the same time when the opening hole cover 14 is detached from the case body 13.

The non-detachable portion 152 of the fan cover 15 is fixed to the case body 13. The detachable portion 151 is engaged with the non-detachable portion 152 such that the air does not leak through a boundary between the detachable portion 151 and the non-detachable portion 152, for example.

The detachable portion 151 is designed to include a part of the fan cover 15 that would be an obstacle to the blower 20 when the blower 20 is taken out in the fan radial direction as indicated by an arrow At. For example, in FIG. 3, the H1 part of the fan cover 15 would be an obstacle to the blower 20. Accordingly, the detachable portion 151 includes a part of the fan cover 15 that overlaps the projected area of the blower 20 projected in the fan radial direction toward the case opening hole 13a (specifically, downward).

For example, as shown in FIGS. 5, 6, the detachable portion 151 has a length extending from the fan axis CL1 to the opening hole cover 14 in a detaching direction of the blower 20 indicated by the arrow At along the up-down direction DR2 of the vehicle. The detachable portion 151 has a width larger than a diameter of the blower fan 201 in a cover width direction perpendicular to the fan axial direction DRa and the detaching direction. That is, the blower fan 201 is smaller, in the cover width direction, than the width of the detachable portion 151. The cover width direction corresponds to a width direction DR3 of the vehicle as shown in FIGS. 5, 6.

As described above, according to the present embodiment, the case body 13 of the air-conditioning case 12 has the case opening hole 13a that is located outward of the blower 20 in the fan radial direction and opens in the fan radial direction (specifically, downward) as shown in FIGS. 3, 5. The opening hole cover 14 of the air-conditioning case 12 is fixed to the case body 13, closes the case opening hole 13a, and is detachable from the case body 13. The case opening hole 13a is large enough that the blower 20 passes through the case opening hole 13a when taking out the blower 20 from the air-conditioning case 12.

The blower 20 can be taken out from the air-conditioning case 12 in the fan radial direction (specifically, downward as indicated by the arrow At) by removing the opening hole cover 14 without disassembling the air-conditioning case 12. Accordingly, the blower 20 can be replaced even when objects that can be obstacles when taking out the blower 20 from the air-conditioning case 12 exist on both the first side and the second side in the fan axial direction DRa. For example, the evaporator 16 and the heater core 18 can be the obstacles located in the fan axial direction DRa with respect to the blower 20 as shown in FIG. 1.

Generally, the blower 20 is moved in the fan axial direction DRa when replacing the blower 20 (that is, when replacing the blower fan 201 and the blower motor 202) disposed in a conventional air-conditioning unit. Accordingly, the blower 20 is replaced after removing components which can be obstacles in the replacement of the blower 20 by moving it in the fan axial direction DRa. The components which can be obstacles are an instrument panel lower cover and a glove compartment, for example.

In some cases, the components which can be obstacles are not removed easily when replacing the blower 20 disposed in a conventional air-conditioning unit. For example, in cases where it takes time to remove the components or where it is difficult to remove the components, the blower 20 is replaced after dismounting the air-conditioning unit from a vehicle and disassembling the air-conditioning unit.

In contrast, according to the vehicular air-conditioning unit 10 of the present embodiment, the blower 20 can be taken in and out in the fan radial direction indicated by the arrow At of FIG. 3. Accordingly, even in a case where the obstacles described above exist in the fan axial direction DRa, the blower 20 can be replaced in a state where the vehicular air-conditioning unit 10 is mounted on a vehicle. That is, the blower 20 can be removed from the vehicular air-conditioning unit 10 being mounted on a vehicle.

Since the blower 20 in the vehicular air-conditioning unit 10 being mounted on a vehicle can be replaced, the step of dismounting the vehicular air-conditioning unit 10 for replacing the blower 20 can be omitted. As a result, it may be possible to: improve the work efficiency at dealerships and shops which replace the blower 20; reduce the work of the dealerships and the shops; and reduce replacement cost to users.

It can be assumed that the obstacles exist in the fan axial direction DRa with respect to the blower 20 in the conventional air-conditioning unit which is configured that the blower 20 is replaced by moving the blower 20 in the fan axial direction DRa. In such a case, in order to replace the blower 20 by moving the blower 20 in the fan axial direction DRa without dismounting the air-conditioning unit from the vehicle, it is required to secure a distance between the obstacles and the blower 20. Accordingly, the air-conditioning unit may need to be large to secure enough distance between the components and the blower 20 when the air-conditioning unit is conventional one. In contrast, according to the vehicular air-conditioning unit 10 of the present embodiment, there is no need to secure the distance between the blower 20 and the obstacles located in the fan axial direction DRa for replacing the blower 20, and it is possible to make the size of the vehicular air-conditioning unit 10 smaller.

Further, since the replacement of the blower 20 can be performed in a direction other than the fan axial direction DRa, restriction on a design for installing the blower 20 in the vehicular air-conditioning unit 10 can be reduced, and the blower 20 can be more freely arranged.

Figure 7:
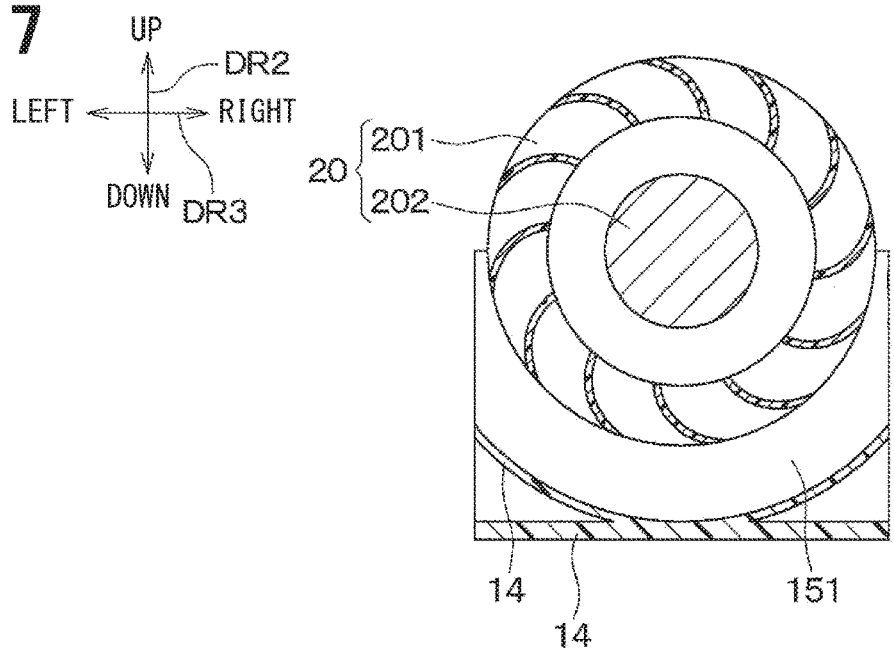
FIG. 7 is a cross-sectional diagram illustrating the same cross-section as FIG. 6, and illustrating a unit including the blower, the opening hole cover, and a detachable portion of a fan cover which are detached when replacing the blower.

According to the present embodiment, the opening hole cover 14 of the air-conditioning case 12 is joined with the blower 20 as shown in FIGS. 3, 6. The blower 20 is detachable from the case body 13 together with the opening hole cover 14. Accordingly, when replacing the blower 20, the blower 20 can be taken out from the air-conditioning case 12 by detaching the opening hole cover 14 from the case body 13. For example, the blower 20 is integrally detached with the opening hole cover 14 and the detachable portion 151 of the fan cover 15 as shown in FIG. 7.

According to the present embodiment, as shown in FIGS. 3, 5, the detachable portion 151 of the fan cover 15 is fixed to the opening hole cover 14, and thereby the detachable portion 151 can be detached from the case body 13 together with the opening hole cover 14. The detachable portion 151 includes a part of the fan cover 15 that overlaps the projected area of the blower 20 projected in the radial direction toward the case opening hole 13a (specifically, downward). Accordingly, the fan cover 15 can be provided so as not to interfere with the replacement of the blower 20.

Further, according to the present embodiment, a projected area of the blower 20 projected toward the case opening hole 13a in the fan radial direction (specifically, downward) is smaller than the case opening hole 13a as shown in FIG. 3, 4. Accordingly, the case opening hole 13a is large enough that the blower 20 passes therethrough when the blower 20 is taken out from the air-conditioning case 12. Accordingly, the blower 20 can be easily taken out of the air-conditioning case 12 in the fan radial direction.

Second Embodiment

A second embodiment of the present disclosure is described next. The present embodiment will be explained primarily with respect to portions different from those of the first embodiment. In addition, explanations of the same or equivalent portions as those in the above embodiment will be omitted or simplified. The same applies to a description of embodiments as described later.

The blower 20 of the present embodiment is not detachable from the case body 13 together with the opening hole cover 14. In this point, the present embodiment is different from the first embodiment.

Specifically, unlike the configurations of the first embodiment shown in FIG. 3, the opening hole cover 14 and the motor support portion 141 are formed as not a single component integrated with each other but as separated components. The stator 202a of the blower motor 202 is fixed to the motor support portion 141, and the motor support portion 141 and the case body 13 are formed as a single component, for example. That is, the blower motor 202 is fixed to the case body 13 separately from the opening hole cover 14.

Accordingly, the opening hole cover 14 can be detached from the case body 13 separately from the blower 20. The opening hole cover 14 of the present embodiment is fixed to the case body 13 by snap-fit or screwing as in the first embodiment, for example.

Since the case opening hole 13a is opened when the opening hole cover 14 is removed from the case body 13, the blower 20 can be taken out from the air-conditioning case 12. For example, the blower 20 is fixed, by snap-fit or screwing, to the motor support portion 141 that is integrated with the case body 13.

The detachable portion 151 of the fan cover 15 is integrally formed with the opening hole cover 14 as in the first embodiment, for example, and accordingly the detachable portion 151 is fixed to the opening hole cover 14.

Figure 8:
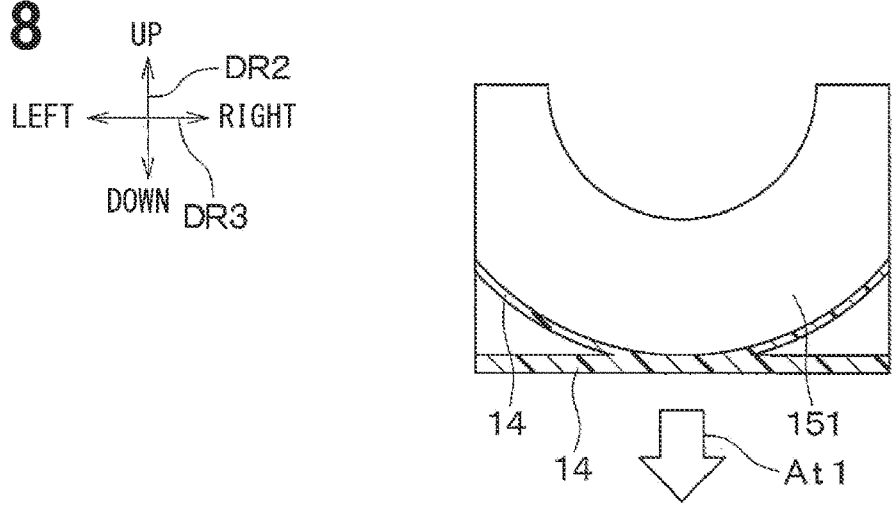
FIG. 8 is a cross-sectional diagram illustrating the same cross-section as FIG. 6, and illustrating an opening hole cover and a detachable portion of a fan cover according to at least one embodiment.

When replacing the blower 20 disposed in the vehicular air-conditioning unit 10 of the present embodiment configured as described above, the opening hole cover 14 is removed from the case body 13 in the fan radial direction as indicated by an arrow At1 of FIG. 8 at first. At this time, the detachable portion 151 integrated with the opening hole cover 14 is removed.

Figure 9:
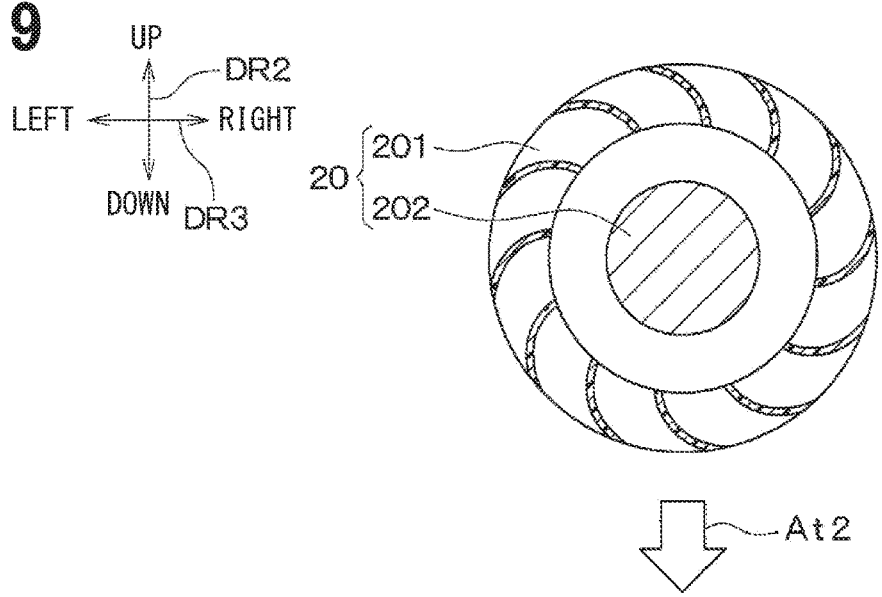
FIG. 9 is a cross-sectional diagram illustrating the same cross-section as FIG. 6, and illustrating a blower according to at least one embodiment.

After removing the opening hole cover 14 and the detachable portion 151, the blower 20 is taken out from the air-conditioning case 12 in the fan radial direction toward the case opening hole 13a (specifically, downward) as indicated by an arrow At2 of FIG. 9.

Aside from the above described aspects, the present embodiment is the same as the first embodiment. Further, in the present embodiment, effects similar to those of the first embodiment described above can be obtained in the same manner as in the first embodiment.

According to the present embodiment, as shown in FIGS. 8, 9, the opening hole cover 14 can be removed from the case body 13 separately from the blower 20. When the opening hole cover 14 is removed from the case body 13, the blower 20 can be taken out from the air-conditioning case 12. Accordingly, since the blower 20 is not required to be supported by the opening hole cover 14 in the air-conditioning case 12, the blower 20 is easily supported. That is, a supporting mechanism for supporting the blower 20 in the air-conditioning case 12 and a fixing mechanism for fixing the opening hole cover 14 to the case body 13 can be simplified.

Third Embodiment

A third embodiment is described next. The present embodiment will be explained mainly with respect to portions different from those of the first embodiment.

Figure 10:
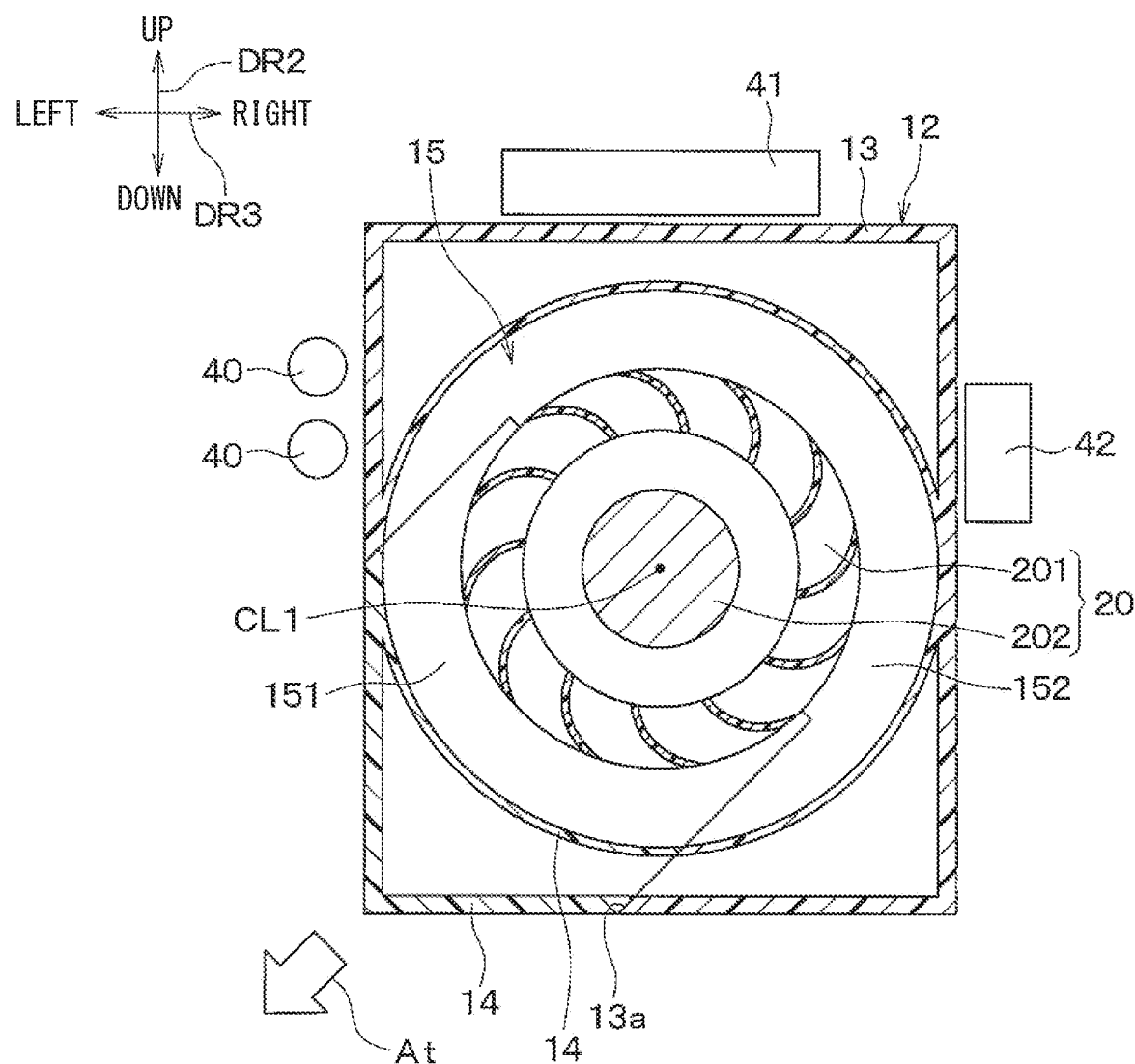
FIG. 10 is a cross-sectional diagram showing a layout of a vehicular air-conditioning unit and air-conditioning peripheral components, showing a direction in which a blower is taken out in at least one embodiment, and corresponding to FIG. 6.

In the present embodiment, air-conditioning peripheral components 40, 41, 42 attached to the vehicular air-conditioning unit 10 are disposed around the air-conditioning case 12 as shown in FIG. 10. The air-conditioning peripheral components are, for example, heater pipes 40 through which an engine cooling water flows into the heater core 18, air-conditioning ducts 41, and an air-conditioning actuators 42.

The blower 20, the opening hole cover 14, and the detachable portion 151 are configured such that the blower 20 can be taken out from the air-conditioning case 12 in a direction in which the air-conditioning peripheral components 40, 41, 42 do not interfere with the replacement of the blower 20. In the present embodiment, the blower 20, the opening hole cover 14, and the detachable portion 151 are removed obliquely downward as indicated by an arrow At of FIG. 10.

Since the vehicular air-conditioning unit 10 of the present embodiment is configured as described above, it is not required for replacing the blower 20 to remove the air-conditioning peripheral components 40, 41, 42 attached to the vehicular air-conditioning unit 10. Accordingly, the step of removing the air-conditioning peripheral components 40, 41, 42 can be omitted. That is, in the present embodiment, the direction in which the blower 20, the opening hole cover 14, and the detachable portion 151 are removed is optimized.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second embodiment described above.

Fourth Embodiment

A fourth embodiment is described next. The present embodiment will be explained mainly with respect to portions different from those of the first embodiment.

Figure 11:
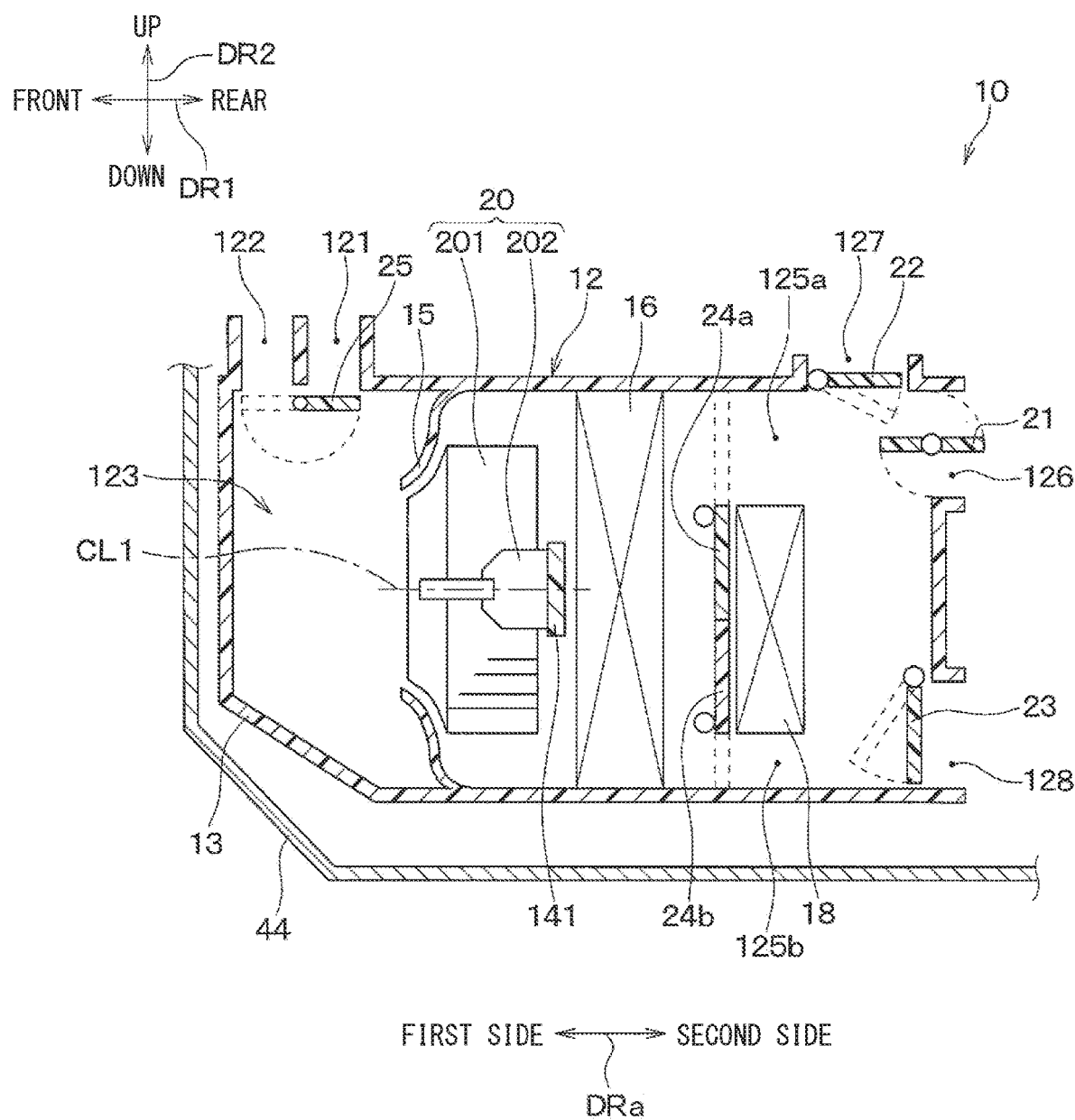
FIG. 11 is a schematic cross-sectional view showing a schematic configuration of a vehicular air-conditioning unit in at least one embodiment, and is a view corresponding to FIG. 1.

In the present embodiment, the blower 20, the evaporator 16, and the heater core 18 are arranged in this order in the case passage 123 in the flow direction of the air as shown in FIG. 11. That is, the blower 20 is located on the most upstream side in the case passage 123.

Further, a front side and a lower side of the vehicular air-conditioning unit 10 are adjacent to a dash panel 44. The dash panel 44 is a part of a body of the vehicle.

The direction in which the blower 20 and the opening hole cover 14 are removed is the fan radial direction also in the present embodiment, but the dash panel 44 exists under the vehicular air-conditioning unit 10. Accordingly, the direction in which the blower 20 and the opening hole cover 14 are removed is a direction other than downward such as upward, rightward, and leftward unlike the first embodiment.

Accordingly, in the present embodiment, the blower 20 can be replaced even when objects that can be obstacles when taking out the blower 20 from the air-conditioning case 12 exist on both the first side and the second side in the fan axial direction DRa, as in the first embodiment. The components located in the fan axial direction DRa with respect to the blower 20 may be the dash panel 44 located on the front side of the vehicle with respect to the blower 20 and the evaporator 16 located on the rear side of the vehicle with respect to the blower 20, as shown in FIG. 11. That is, the components located on the first side or the second side of the blower 20 in the fan axial direction DRa are not limited to the components of the vehicular air-conditioning unit 10.

The blower 20 can be replaced without dismounting the vehicular air-conditioning unit 10 from the vehicle.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second and third embodiments described above.

Fifth Embodiment

A fifth embodiment is described next. The present embodiment will be explained mainly with respect to portions different from those of the first embodiment.

Figure 12:
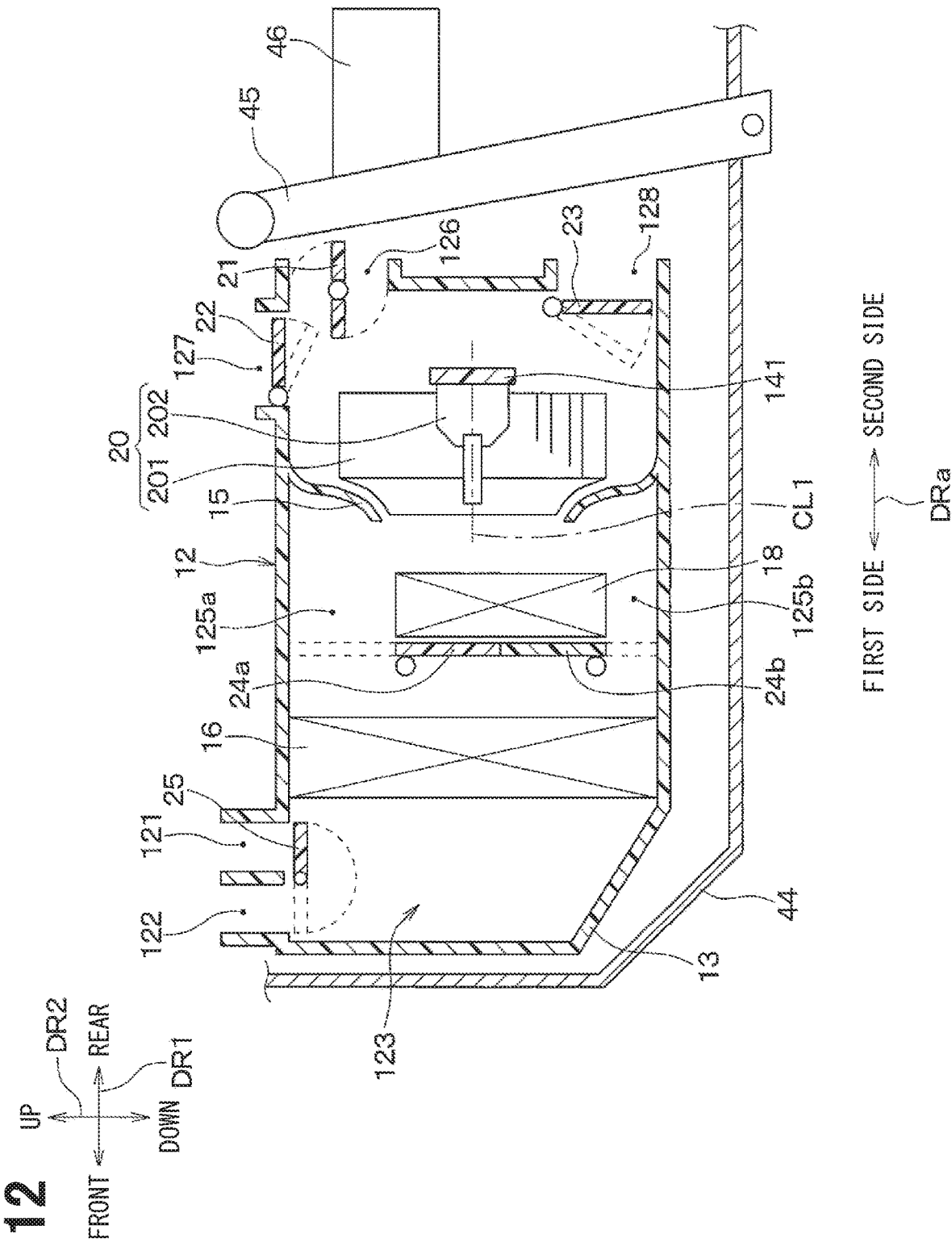
FIG. 12 is a schematic cross-sectional view showing a schematic configuration of a vehicular air-conditioning unit in at least one embodiment, and is a view corresponding to FIG. 1.

In the present embodiment, the evaporator 16, the heater core 18, and the blower 20 are arranged in this order in the case passage 123 in the flow direction of the air as shown in FIG. 12. That is, the blower 20 is located on the most downstream side in the case passage 123.

Further, a front side and a lower side of the vehicular air-conditioning unit 10 are adjacent to a dash panel 44. Moreover, a rear side of the vehicular air-conditioning unit 10 is adjacent to a reinforcing plate 45 and an audio device 46. The reinforcing plate 45 and the audio device 46 are parts of the instrument panel.

The direction in which the blower 20 and the opening hole cover 14 are removed is the fan radial direction also in the present embodiment, but the dash panel 44 exists under the vehicular air-conditioning unit 10. Accordingly, the direction in which the blower 20 and the opening hole cover 14 are removed is a direction other than downward such as upward, rightward, and leftward in the vehicle as in the fourth embodiment.

Accordingly, in the present embodiment, the blower 20 can be replaced even when objects that can be obstacles when taking out the blower 20 from the air-conditioning case 12 exist on both the first side and the second side in the fan axial direction DRa, as in the first embodiment. The components located in the fan axial direction DRa with respect to the blower 20 may be the heater core 18 located on the front side of the vehicle with respect to the blower 20, and the reinforcing plate 45 and the audio device 46 located on rear side of the vehicle with respect to the blower 20, as shown in FIG. 12.

The blower 20 can be replaced without dismounting the vehicular air-conditioning unit 10 from the vehicle.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second and third embodiments described above.

Sixth Embodiment

A sixth embodiment is described next. The present embodiment will be explained mainly with respect to portions different from those of the first embodiment.

Figure 13:
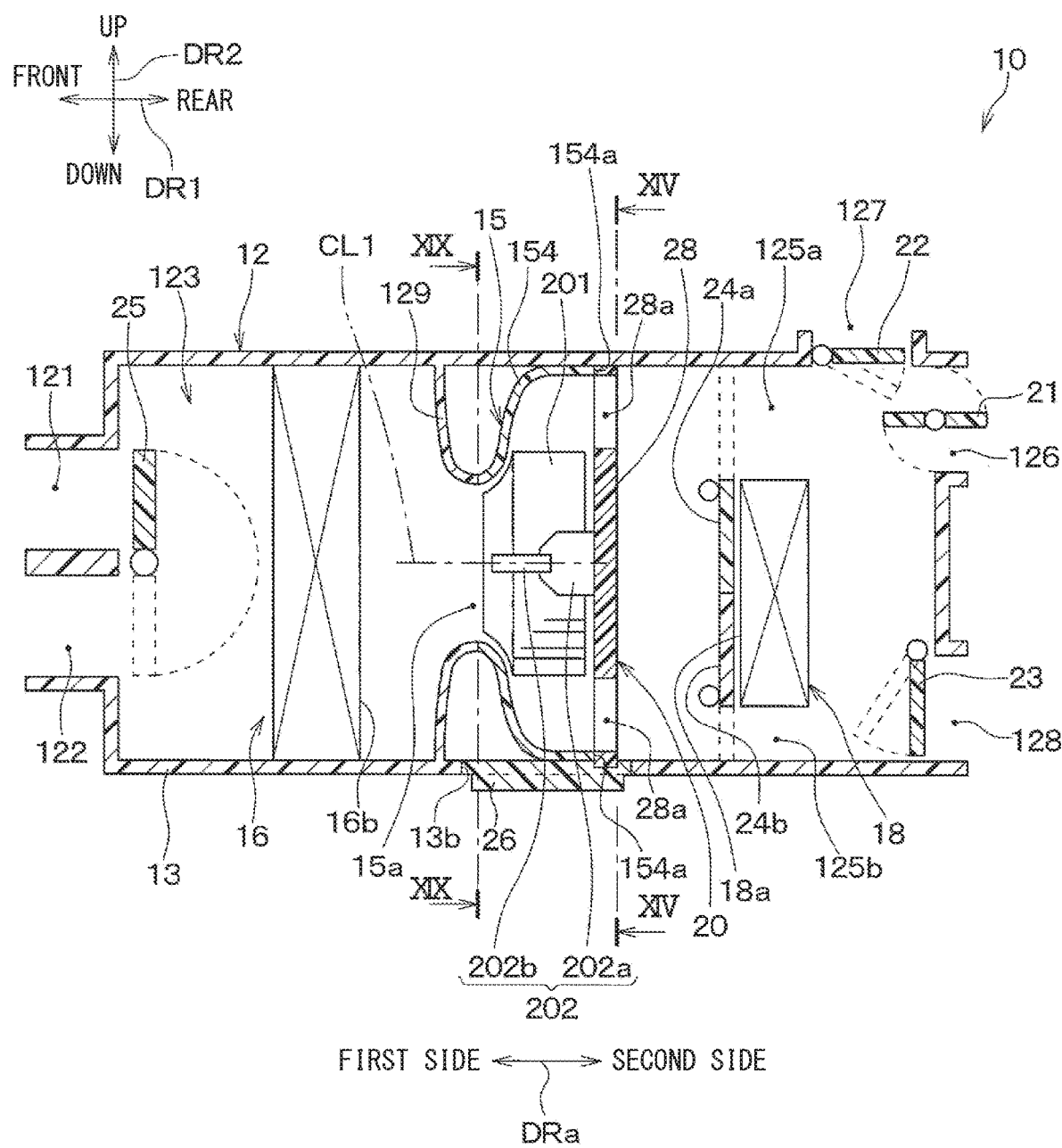
FIG. 13 is a schematic cross-sectional view showing a schematic configuration of a vehicular air-conditioning unit in at least one embodiment, and is a view corresponding to FIG. 1.

In the present embodiment, the blower 20 can be taken out from the air-conditioning case 12 in a first radial direction $D1r$ that is one of the fan radial direction and in a second radial direction $D2r$ that is another one of the fan radial direction as shown in FIGS. 13 to 16. That is, the blower 20 can be removed in two different radial directions $D1r$, $D2r$. In this point, the present embodiment is different from the first embodiment. A vicinity of the blower 20 of FIG. 13 is a cross-section taken along XIII-XIII line of FIG. 14.

Figure 14:
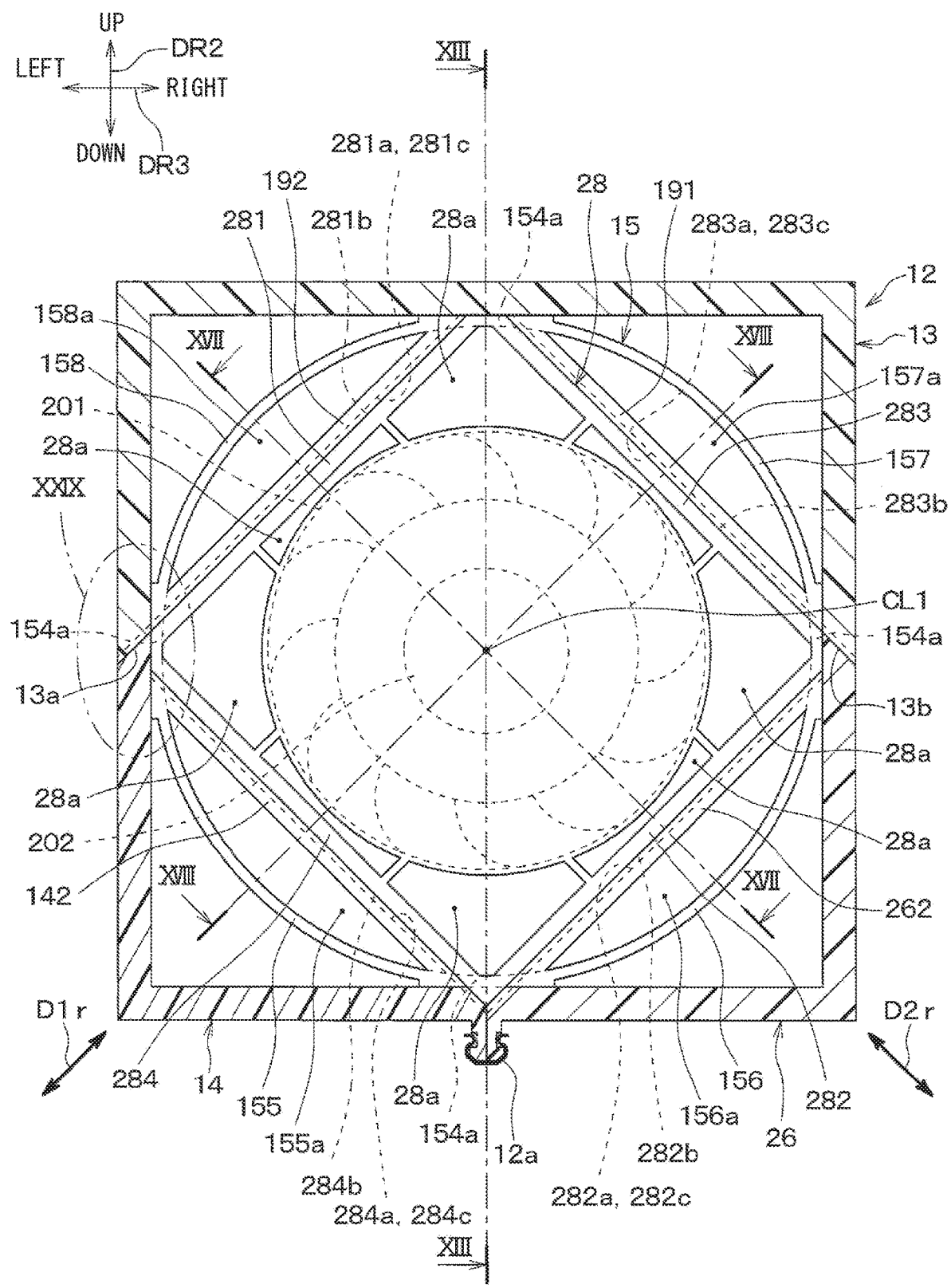
FIG. 14 is a cross-sectional view taken along line XIV-XIV of FIG. 13.

Specifically, the case body 13 has two case opening holes 13a, 13b which are a first case opening hole 13a and a second case opening hole 13b as shown in FIGS. 13, 14. The first case opening hole 13a and the second case opening hole 13b are located outward of the blower 20 in the fan radial direction and open in the fan radial direction. The first case opening hole 13a opens in the first radial direction D1r, and the second case opening hole 13b opens in the second radial direction D2r. In the present embodiment, the second radial direction D2r is perpendicular to the first radial direction D1r.

Figure 15:
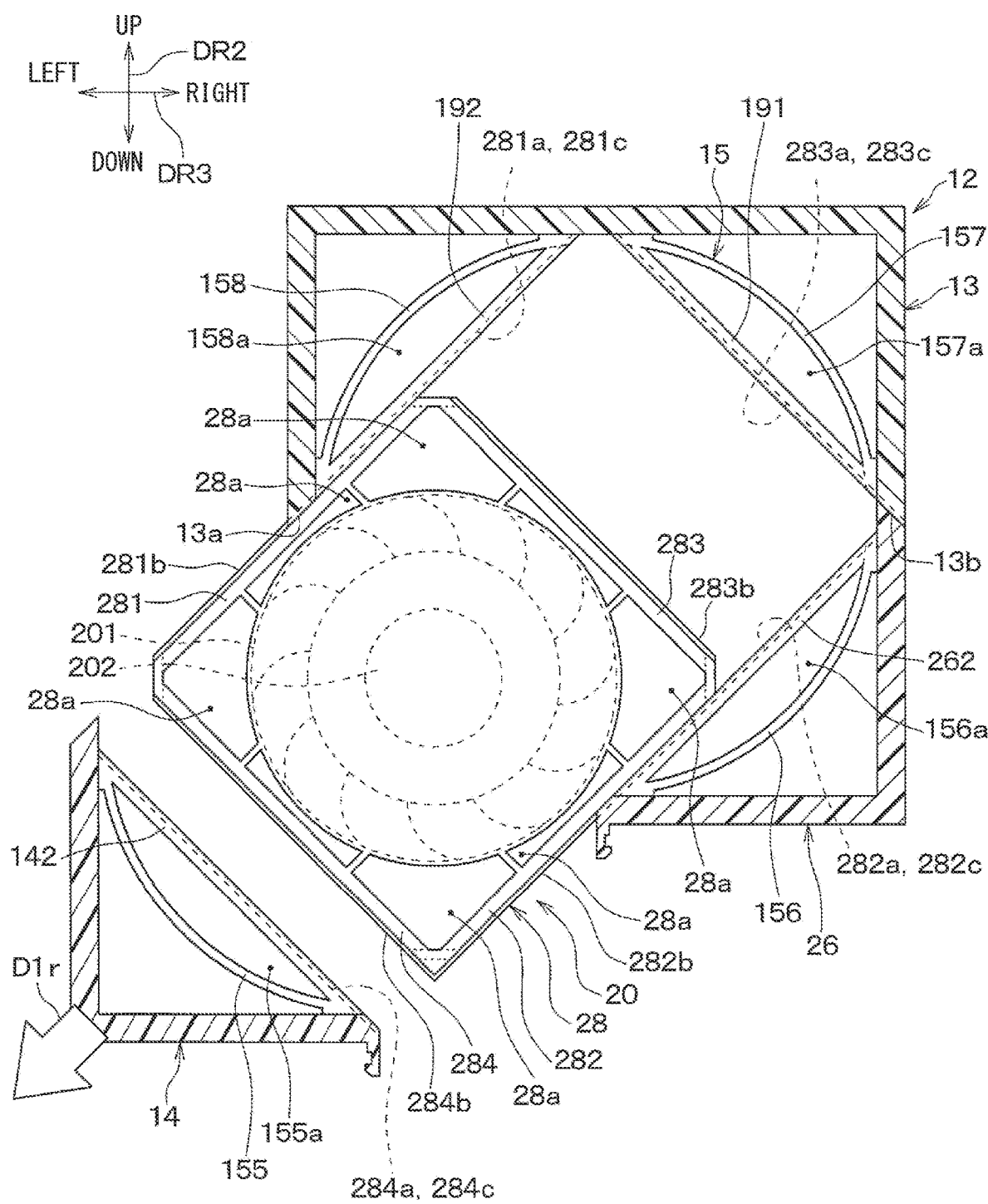
FIG. 15 is a cross-sectional diagram showing the same cross-section as FIG. 14, and showing a situation where a first case opening hole is opened to take out a blower from an air-conditioning case in a first radial direction.
Figure 16:
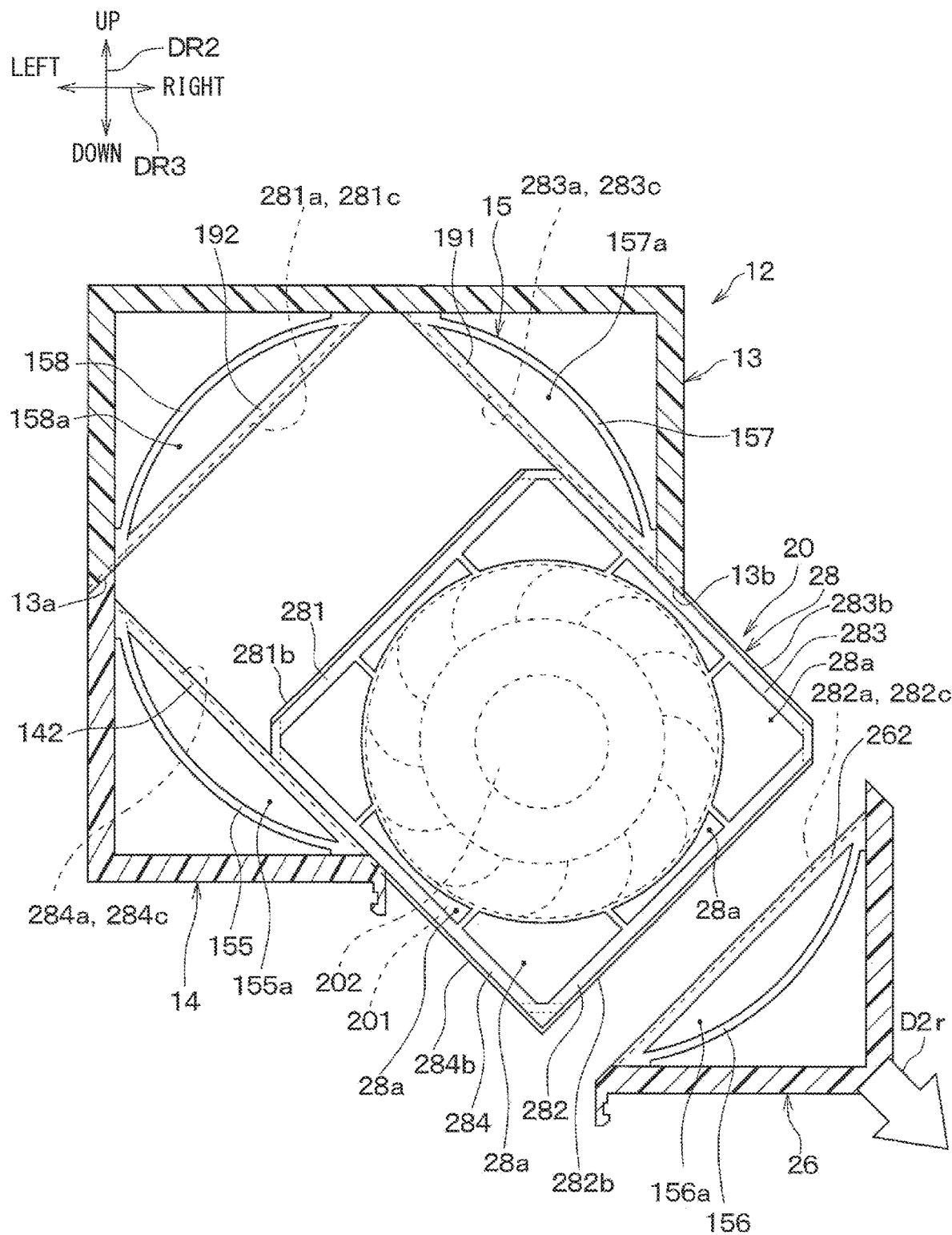
FIG. 16 is a cross-sectional diagram showing the same cross-section as FIG. 14, and illustrating a situation where a second case opening hole is opened to take out the blower from the air-conditioning case in a second radial direction.

As shown in FIG. 15, the first case opening hole 13a is large enough that the blower 20 passes through the first case opening hole 13a when taking out the blower 20 from the air-conditioning case 12 in the first radial direction D1r. The same applies to the second case opening hole 13b. As shown in FIG. 16, the second case opening hole 13b is large enough that the blower 20 passes through the second case opening hole 13b when taking out the blower 20 from the air-conditioning case 12 in the second radial direction D2r.

As shown in FIGS. 14 to 16, the air-conditioning case 12 includes two opening hole covers 14, 26 which are a first opening hole cover 14 and a second opening hole cover 26. The first opening hole cover 14 is removable from the case body 13 independently from the second opening hole cover 26 and the blower 20. The second opening hole cover 26 is removable from the case body 13 independently from the first opening hole cover 14 and the blower 20.

The first opening hole cover 14 is fixed to the case body 13 and closes the first case opening hole 13a. Similarly, the second opening hole cover 26 is fixed to the case body 13 and closes the second case opening hole 13b. As shown in FIG. 14, the first opening hole cover 14 closing the first case opening hole 13a and the second opening hole cover 26 closing the second case opening hole 13b are fixed with each other by a connection member 12a such as a holder spring.

Since the first opening hole cover 14 closes the first case opening hole 13a as described above, the blower 20 can be taken out from the air-conditioning case 12 as shown in FIG. 15 when the first opening hole cover 14 is removed from the case body 13. That is, when the first opening hole cover 14 is removed from the case body 13, the blower 20 can be taken out from the air-conditioning case 12 in the first radial direction D1r through the first case opening hole 13a. In the present embodiment, the blower 20 can be taken out obliquely leftward and downward along the first radial direction D1r.

Since the second opening hole cover 26 closes the second case opening hole 13b, the blower 20 can be taken out from the air-conditioning case 12 as shown in FIG. 16 when the second opening hole cover 26 is removed from the case body 13. That is, when the second opening hole cover 26 is removed from the case body 13, the blower 20 can be taken out from the air-conditioning case 12 in the second radial direction D2r through the second case opening hole 13b. In the present embodiment, the blower 20 can be taken out obliquely rightward and downward along the second radial direction D2r.

As can be seen in FIG. 14, when both the two opening hole covers 14, 26 are removed from the case body 13, the first case opening hole 13a and the second case opening hole 13b form one continuous opening.

As shown in FIGS. 13, 14, the blower 20 has a motor fixation portion 28 to which the stator 202a of the blower motor 202 is fixed, in addition to the blower fan 201 and the blower motor 202. Accordingly, when taking out the blower 20 from the air-conditioning case 12 as shown in FIGS. 15, 16, the motor fixation portion 28 is taken out from the air-conditioning case 12 together with the blower fan 201 and the blower motor 202.

As shown in FIGS. 13, 14, the motor fixation portion 28 extends in the first radial direction D1r and the second radial direction D2r. The motor fixation portion 28 is located on the second side of the blower fan 201 in the fan axial direction DRa. That is, the motor fixation portion 28 is located downstream of the blower fan 201, and the motor fixation portion 28 has multiple through-holes 28a through which the air that has passed through the blower fan 201 flows. The through-hole 28a extends through the motor fixation portion 28 in the fan axial direction DRa. Since the motor fixation portion 28 has the through-holes 28a, the motor fixation portion 28 is configured not to obstruct the airflow from the blower fan 201. The motor fixation portion 28 of the present embodiment has a substantially plate shape whose thickness direction is the fan axial direction DRa, and has a substantially square shape when viewed along the fan axial direction DRa.

The motor fixation portion 28 has a first guided portion 281, a second guided portion 282, a third guided portion 283, and a fourth guided portion 284. The first guided portion 281 and the second guided portion 282 are in parallel with each other and extend in the first radial direction D1r. The third guided portion 283 and the fourth guided portion 284 are in parallel with each other and extend in the second radial direction D2r.

The first guided portion 281, the second guided portion 282, the third guided portion 283, and the fourth guided portion 284 are four sides of the substantially square shape of the motor fixation portion 28. That is, the first guided portion 281, the second guided portion 282, the third guided portion 283, and the fourth guided portion 284 are periphery of the motor fixation portion 28. The first guided portion 281, the second guided portion 282, the third guided portion 283, and the fourth guided portion 284 are located outward of the blower fan 201 in the fan radial direction.

As shown in FIG. 14, the second guided portion 282 is closer to the second opening hole cover 26 than the first guided portion 281 is to. Specifically, the first guided portion 281 and the second guided portion 282 are aligned in the second radial direction D2r, and are opposite sides across the fan axis CL1.

The fourth guided portion 284 is closer to the first opening hole cover 14 than the third guided portion 283 is to. Specifically, the third guided portion 283 and the fourth guided portion 284 are aligned in the first radial direction D1r, and are opposite sides across the fan axis CL1.

The first opening hole cover 14 has a first cover guide portion 142 as a fourth guide portion corresponding to the fourth guided portion 284. That is, the first cover guide portion 142 is fixed to a part of the air-conditioning case 12 other than the second opening hole cover 26. The first cover guide portion 142 extends along the fourth guided portion 284 in the second radial direction D2r, and is in contact with the fourth guided portion 284 so as to be relatively movable in the second radial direction D2r.

The second opening hole cover 26 has a second cover guide portion 262 as a second guide portion corresponding to the second guided portion 282. That is, the second cover guide portion 262 is fixed to a part of the air-conditioning case 12 other than the first opening hole cover 14. The second cover guide portion 262 extends along the second guided portion 282 in the first radial direction D1r, and is in contact with the second guided portion 282 so as to be relatively movable in the first radial direction D1r.

The air-conditioning case 12 has a first case guide portion 191 as a third guide portion corresponding to the third guided portion 283, and a second case guide portion 192 as a first guide portion corresponding to the first guided portion 281. The first case guide portion 191 and the second case guide portion 192 are fixed to the case body 13. That is, the first case guide portion 191 and the second case guide portion 192 are fixed to a part of the air-conditioning case 12 other than the first opening hole cover 14 and the second opening hole cover 26.

The first case guide portion 191 extends along the third guided portion 283 in the second radial direction D2r. The first case guide portion 191 is in contact with the third guided portion 283 so as to be relatively movable in the second radial direction D2r.

The second case guide portion 192 extends along the first guided portion 281 in the first radial direction D1r. The second case guide portion 192 is in contact with the first guided portion 281 so as to be relatively movable in the first radial direction D1r.

Accordingly, the first opening hole cover 14 is removed from the case body 13 with the second opening hole cover 26 fixed to the case body 13 when the blower 20 is taken out from the air-conditioning case 12 in the first radial direction D1r as shown in FIG. 15, for example. The motor fixation portion 28 of the blower 20 is guided by the second case guide portion 192 and the second cover guide portion 262, and accordingly the blower 20 is taken out in the first radial direction D1r.

That is, when the blower 20 is taken out from the air-conditioning case 12 in the first radial direction D1r, the first guided portion 281 is guided by the second case guide portion 192, and the second guided portion 282 is guided by the second cover guide portion 262 according to the motion of the blower 20 in the first radial direction D1r. Accordingly, when the blower 20 is inserted into the air-conditioning case 12 in the first radial direction D1r, for example, the second case guide portion 192 and the second cover guide portion 262 functions as guides for the insertion of the blower 20.

When the blower 20 is taken out from the air-conditioning case 12 in the second radial direction D2r as shown in FIG. 16, for example, the second opening hole cover 26 is removed from the case body 13 with the first opening hole cover 14 fixed to the case body 13. The motor fixation portion 28 of the blower 20 is guided by the first case guide portion 191 and the first cover guide portion 142, and thereby the blower 20 is taken out in the second radial direction D2r.

That is, when the blower 20 is taken out from the air-conditioning case 12 in the second radial direction D2r, the third guided portion 283 is guided by the first case guide portion 191, and the fourth guided portion 284 is guided by the first cover guide portion 142 according to the motion of the blower 20 in the second radial direction D2r. Accordingly, when the blower 20 is inserted into the air-conditioning case 12 in the second radial direction D2r, for example, the first case guide portion 191 and the first cover guide portion 142 functions as guides for the insertion of the blower 20.

Figure 17:
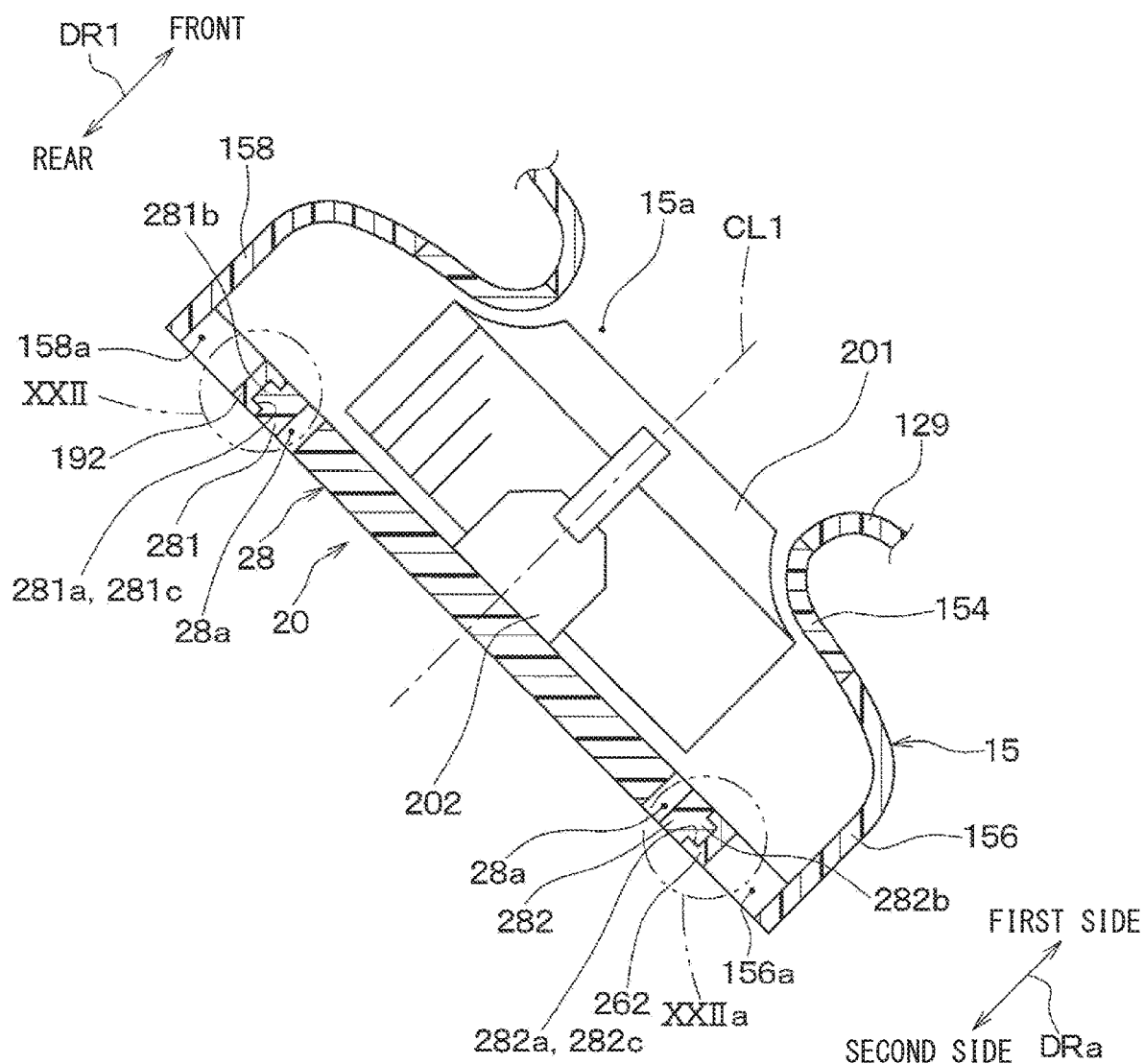
FIG. 17 is a cross-sectional view taken along line XVII-XVII of FIG. 14.

Specifically, the first guided portion 281 and the second case guide portion 192 face each other in a direction perpendicular to the fan axial direction DRa and the first radial direction D1r (e.g. the second radial direction D2r in FIG. 14) as shown in FIGS. 14, 17. A first groove 281a is formed in the second case guide portion 192. The first groove 281a is recessed in a direction intersecting the fan axis CL1 (specifically, in a direction perpendicular to the fan axis CL1) and extends in the first radial direction D1r. The first guided portion 281 has a first protrusion 281b that fits into the first groove 281a. The first protrusion 281b is relatively movable in the first radial direction D1r with respect to the wall surface 281c of the first groove 281a. Accordingly, when the first guided portion 281 is guided by the second case guide portion 192 as the blower 20 moves in the first radial direction D1r, the first protrusion 281b is fitted into the first groove 281a and moves in the first radial direction D1r.

For example, the first groove 281a is formed over the entire length or substantially the entire length of the second case guide portion 192. The first protrusion 281b extends in the first radial direction D1r, and is formed over the entire length or substantially the entire length of the first guided portion 281. Since the wall surface 281c of the first groove 281a is a wall facing the first groove 281a, the wall surface 281c may be a bottom surface or a lateral surface defining the first groove 281a. This is the same for wall surfaces 282c to 284c of second to fourth grooves 282a to 284a described later.

The second guided portion 282 and the second cover guide portion 262 face each other in a direction perpendicular to the fan axial direction DRa and the first radial direction D1r. A second groove 282a is formed in the second cover guide portion 262. The second groove 282a is recessed in a direction intersecting the fan axis CL1 (specifically, in a direction perpendicular to the fan axis CL1) and extends in the first radial direction D1r. The second guided portion 282 has a second protrusion 282b that fits into the second groove 282a. The second protrusion 282b is relatively movable in the first radial direction D1r with respect to the wall surface 282c of the second groove 282a. Accordingly, when the second guided portion 282 is guided by the second cover guide portion 262 as the blower 20 moves in the first radial direction D1r, the second protrusion 282b is fitted into the second groove 282a and moves in the first radial direction D1r.

For example, the second groove 282a is formed over the entire length or substantially the entire length of the second cover guide portion 262. The second protrusion 282b extends in the first radial direction D1r, and is formed over the entire length or substantially the entire length of the second guided portion 282.

Figure 18:
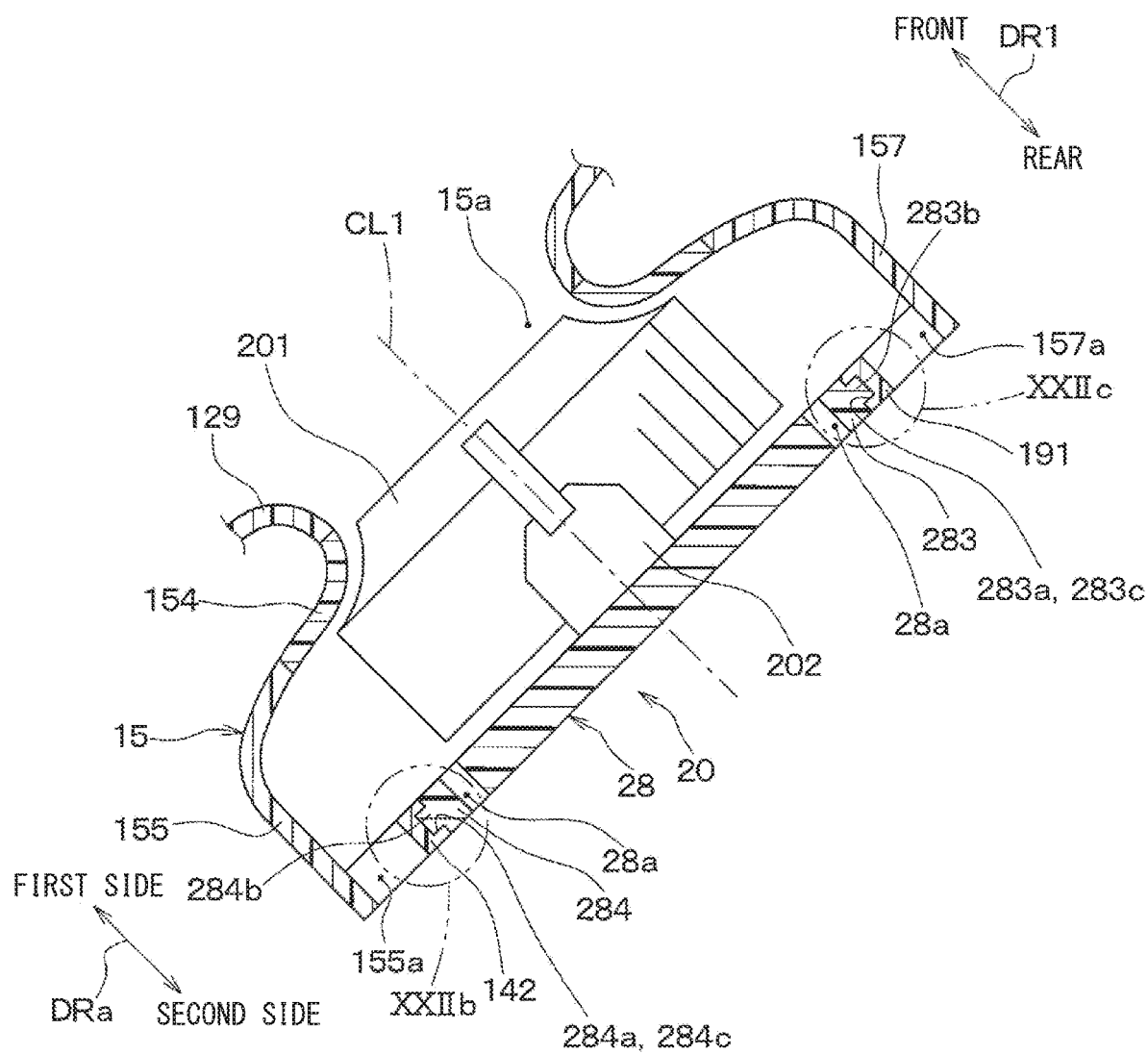
FIG. 18 is a cross-sectional view taken along line XVIII-XVIII of FIG. 14.

The third guided portion 283 and the first case guide portion 191 face each other in a direction perpendicular to the fan axial direction DRa and the second radial direction D2r (e.g. the first radial direction D1r in FIG. 14) as shown in FIGS. 14, 18. A third groove 283a is formed in the first case guide portion 191. The third groove 283a is recessed in a direction intersecting the fan axis CL1 (specifically, in a direction perpendicular to the fan axis CL1) and extends in the second radial direction D2r. The third guided portion 283 has a third protrusion 283b that fits into the third groove 283a. The third protrusion 283b is relatively movable in the second radial direction D2r with respect to the wall surface 283c of the third groove 283a. Accordingly, when the third guided portion 283 is guided by the first case guide portion 191 as the blower 20 moves in the second radial direction D2r, the third protrusion 283b is fitted into the third groove 283a and moves in the second radial direction D2r.

For example, the third groove 283a is formed over the entire length or substantially the entire length of the first case guide portion 191. The third protrusion 283b extends in the second radial direction D2r, and is formed over the entire length or substantially the entire length of the third guided portion 283.

The fourth guided portion 284 and the first cover guide portion 142 face each other in a direction perpendicular to the fan axial direction DRa and the second radial direction D2r. A fourth groove 284a is formed in the first cover guide portion 142. The fourth groove 284a is recessed in a direction intersecting the fan axis CL1 (specifically, in a direction perpendicular to the fan axis CL1) and extends in the second radial direction D2r. The fourth guided portion 284 has a fourth protrusion 284b that fits into the fourth groove 284a. The fourth protrusion 284b is relatively movable in the second radial direction D2r with respect to the wall surface 284c of the fourth groove 284a. Accordingly, when the fourth guided portion 284 is guided by the first cover guide portion 142 as the blower 20 moves in the second radial direction D2r, the fourth protrusion 284b is fitted into the fourth groove 284a and moves in the second radial direction D2r.

For example, the fourth groove 284a is formed over the entire length or substantially the entire length of the first cover guide portion 142. The fourth protrusion 284b extends in the second radial direction D2r, and is formed over the entire length or substantially the entire length of the fourth guided portion 284.

Figure 19:
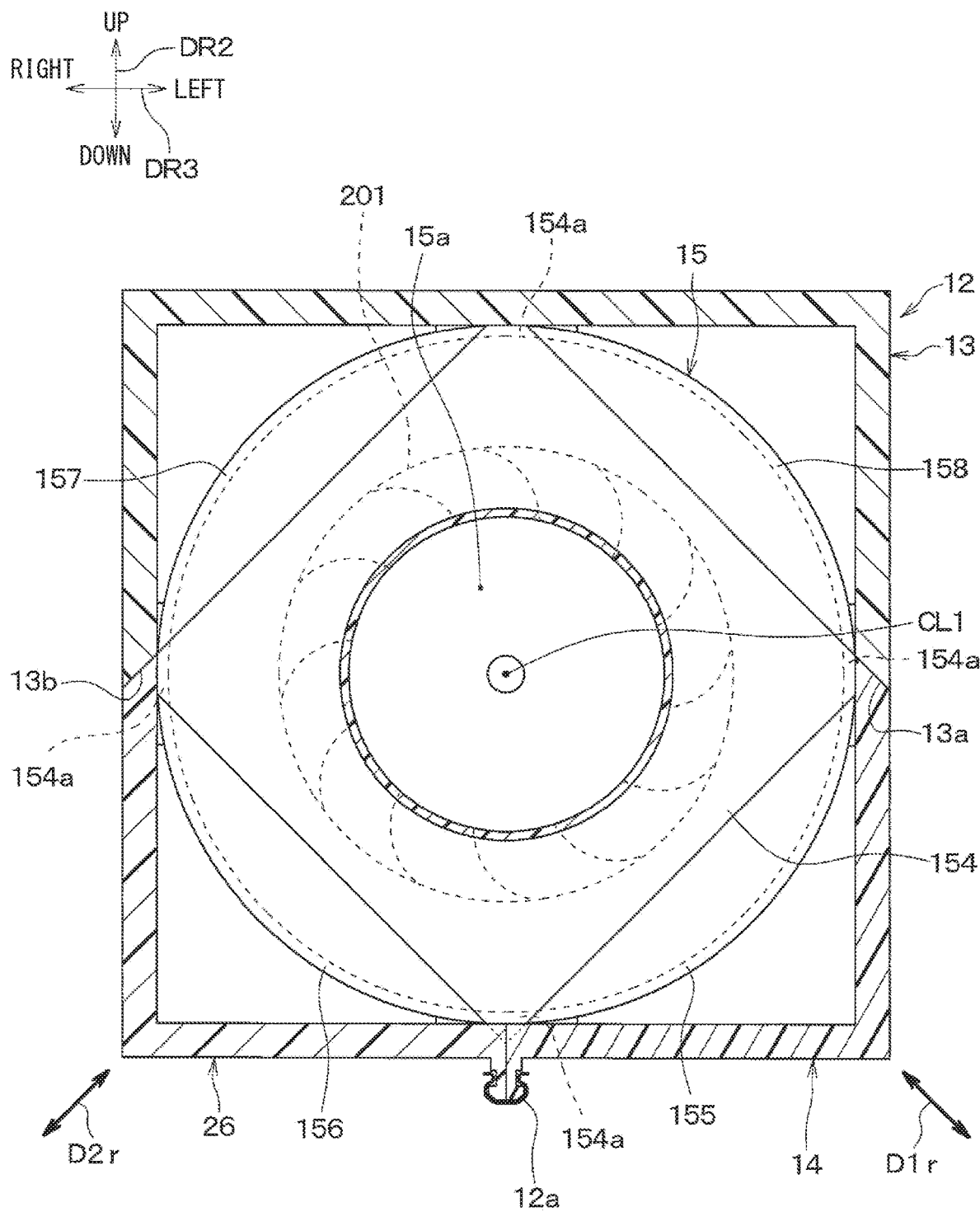
FIG. 19 is a cross-sectional view taken along line XIX-XIX of FIG. 13.

As shown in FIGS. 13, 19, the fan cover 15 of the present embodiment covers the blower fan 201 from a first side in the fan axial direction DRa outward in the radial direction. The fan cover 15 defines the fan intake air hole 15a as in the first embodiment.

An air guide panel portion 129 is located on a first side of the fan cover 15 in the fan axial direction DRa in the air-conditioning case 12. The air guide panel portion 129 has a plate shape extending in the fan radial direction, and a rim of the air guide panel portion 129 is fixed to the case body 13. A through-hole having substantially the same diameter as the fan intake air hole 15a is formed at the center of the air guide plate portion 129, and a bell mouth for guiding air to the fan intake air hole 15a is formed around the through-hole. Accordingly, the air guide plate portion 129 is configured to guide the air flowing out of the evaporator 16 toward the fan intake air hole 15a.

The fan cover 15 of the present embodiment is separated into five parts including a blower integrated part 154, a first cover integrated part 155, a second cover integrated part 156, a first case fixation part 157, and a second case fixation part 158. That is, the fan cover 15 is formed by the blower integrated part 154, the first cover integrated part 155, the second cover integrated part 156, the first case fixation part 157, and the second case fixation part 158 joined and integrated with each other.

The blower integrated part 154 has a substantially square shape, which is the same as the motor fixation portion 28, when viewed along the fan axial direction DRa. The blower integrated part 154 is a part of the blower 20 and removable from the air-conditioning case 12. Accordingly, when taking out the blower 20 from the air-conditioning case 12, the blower integrated part 154 is taken out from the air-conditioning case 12 together with the blower fan 201 and the blower motor 202.

Specifically, the blower integrated part 154 is joined and fixed to the motor fixation portion 28 at four vertices of the substantially square shape. That is, the blower integrated part 154 has second side end parts 154a corresponding to the four vertices and located on the second side in the fan axial direction DRa, and the blower integrated part 154 is joined and fixed to the motor fixation portion 28 at the second side end parts 154a.

The fan intake air hole 15a is formed in the blower integrated part 154 of the fan cover 15. Although the blower integrated part 154 is in contact with the air guide plate portion 129 around the fan intake air hole 15a, the blower integrated part 154 is not fixed to the guide plate portion 129, and the air guide plate portion 129 does not interfere with the blower 20 when replacing the blower 20.

The first cover integrated part 155 is closer in the first radial direction D1r to a first open side that is opened when the first opening hole cover 14 is removed from the case body 13 than the blower integrated part 154 is to.

The first cover integrated part 155 is a part of the first opening hole cover 14. The first cover integrated part 155 is removed from the case body 13 when the first opening hole cover 14 is removed from the case body 13.

The first cover integrated part 155 includes a second side end part on the second side in the fan axial direction DRa. The second side end part of the first cover integrated part 155 has an arc shape and is connected to the first cover guide portion 142 as shown in FIG. 14, and the second side end part and the first cover guide portion 142 define a through-hole 155a. A part of the air blown out from the blower fan 201 flows through the through-hole 155a to the downstream side of the motor fixation portion 28.

As shown in FIGS. 14, 19, the second cover integrated part 156 is closer in the second radial direction D2r to a second open side that is opened when the second opening hole cover 26 is removed from the case body 13 than the blower integrated part 154 is to.

The second cover integrated part 156 is a part of the second opening hole cover 26. The second cover integrated part 156 is removed from the case body 13 when the second opening hole cover 26 is removed from the case body 13.

The second cover integrated part 156 includes a second side end part on the second side in the fan axial direction DRa. The second side end part of the second cover integrated part 156 has an arc shape and is connected to the second cover guide portion 262 as shown in FIG. 14, and the second side end part and the second cover guide portion 262 define a through-hole 156a. A part of the air blown out from the blower fan 201 flows through the through-hole 156a to the downstream side of the motor fixation portion 28.

As shown in FIGS. 14, 19, the first case fixation part 157 is located on the opposite side of the blower integrated part 154 in the first radial direction D1r from the first cover integrated part 155. The second case fixation part 158 is located on the opposite side of the blower integrated part 154 in the second radial direction D2r from the second cover integrated part 156. The first case fixation part 157 and the second case fixation part 158 are fixed to the case body 13.

The first case fixation part 157 includes a second side end part on the second side in the fan axial direction DRa. The second side end part of the first case fixation part 157 has an arc shape and is connected to the first case guide portion 191 as shown in FIG. 14, and the second side end part and the first case guide portion 191 define a through-hole 157a. A part of the air blown out from the blower fan 201 flows through the through-hole 157a to the downstream side of the motor fixation portion 28.

Similarly, the second case fixation part 158 has a second side end part on the second side in the fan axial direction DRa. The second side end part of the second case fixation part 158 has an arc shape and is connected to the second case guide portion 192, and the second side end part and the second case guide portion 192 define a through-hole 158a. A part of the air blown out from the blower fan 201 flows through the through-hole 158a to the downstream side of the motor fixation portion 28.

As described above, according to the present embodiment, when the first opening hole cover 14 is removed from the case body 13, the blower 20 can be taken out from the air-conditioning case 12 in the first radial direction D1r through the first case opening hole 13a as shown in FIG. 15. Further, as shown in FIG. 16, when the second opening hole cover 26 is removed from the case body 13, the blower 20 can be taken out from the air-conditioning case 12 in the second radial direction D2r through the second case opening hole 13b.

Accordingly, when replacing the blower 20 in the vehicle on which the vehicular air-conditioning unit 10 is mounted, and when the components around the vehicular air-conditioning unit 10 interfere with the replacement of the blower 20 in the first radial direction D1r, the blower 20 can be detached in the second radial direction D2r. Conversely, when the components around the vehicular air-conditioning unit 10 interfere with the replacement of the blower 20 in the second radial direction D2r, the blower 20 can be detached in the first radial direction D1r. As described above, since the blower 20 can be detached along multiple directions, one type of the vehicular air-conditioning unit 10 from which the blower 20 can be taken out can be installed into various vehicles. Since the number of types of the vehicular air-conditioning unit 10 is limited, the manufacturing steps and the management processes can be reduced. As a result, the manufacturing cost of the vehicular air-conditioning unit 10 can be reduced.

For example, it can be assumed that the vehicular air-conditioning unit 10 is arranged at the center of the instrument panel in the passenger compartment in the width direction DR3 of the vehicle. In this case, if the vehicle is a right-hand drive vehicle, the blower 20 can be removed toward the passenger seat without interference of the pedals on the driver seat side by removing the first opening hole cover 14 shown in FIG. 14. Conversely, if the vehicle is a left-hand drive vehicle, the blower 20 can be removed toward the passenger seat without interference of the pedals on the driver seat side by removing the second opening hole cover 26 shown in FIG. 14.

That is, common vehicular air-conditioning unit 10 can be used for both the right-hand drive vehicle and the right-hand drive vehicle, and accordingly the number of types of the vehicular air-conditioning unit 10 can be limited.

According to the present embodiment, as shown in FIG. 14, the motor fixation portion 28 of the blower 20 has the first guided portion 281 and the second guided portion 282 extending in the first radial direction D1r in parallel with each other. The motor fixation portion 28 has the third guided portion 283 and the fourth guided portion 284 extending in the second radial direction D2r in parallel with each other. As shown in FIG. 15, the blower may 20 be taken out from the air-conditioning case 12 along the first radial direction D1r. In this case, the first guided portion 281 is guided by the second case guide portion 192, and the second guided portion 282 is guided by the second cover guide portion 262 as the blower moves in the first radial direction D1r. In contrast, the blower 20 may be taken out from the air-conditioning case 12 along the second radial direction D2r as shown in FIG. 16. In this case, the third guided portion 283 is guided by the first case guide portion 191, and the fourth guided portion 284 is guided by the first cover guide portion 142 as the blower 20 moves in the second radial direction D2r.

Accordingly, the blower 20 can be easily moved along a direction in which the blower 20 is taken out when the blower 20 is taken out along each direction of the first radial direction D1r or the second radial direction D2r. Accordingly, workability of the replacement of the blower 20 can be improved. As a result, productivity can be increased, and cost can be decreased.

The replacement of the blower 20 may be difficult due to the arrangement of the vehicular air-conditioning unit 10 in a vehicle. In such a case, the configurations in which the blower 20 can be easily moved when replacing the blower 20 are particularly effective. For example, when the vehicular air-conditioning unit 10 is located in a vicinity of a floor of the passenger compartment, and when the blower 20 is removed obliquely downward with respect to the vehicular air-conditioning unit 10, the configuration of the vehicular air-conditioning unit 10 of the present embodiment can reduce the difficulty in moving the blower 20 obliquely downward.

Further, according to the present embodiment, the motor fixation portion 28 extends in the first radial direction D1r and the second radial direction D2r as shown in FIGS. 14 to 16. The first guided portion 281, the second guided portion 282, the third guided portion 283, and the fourth guided portion 284 are periphery of the motor fixation portion 28. Accordingly, the distance between the first guided portion 281 and the second guided portion 282, and the distance between the third guided portion 283 and the fourth guided portion 284 can be easily secured. Therefore, the blower 20 can be stably guided along the first radial direction D1r or the second radial direction D2r when replacing the blower 20.

According to the present embodiment, the blower fan 201 is configured to draw the air from the first side in the fan axial direction DRa by rotating about the fan axis CL1 as shown in FIGS. 13, 14. The motor fixation portion 28 is located on the second side of the blower fan 201 in the fan axial direction DRa. The motor fixation portion 28 has multiple through-holes 28a through which the air blown out from the blower fan 201 flows. Accordingly, the first to fourth guided portions 281, 282, 283, 284 can be arranged such that the motor fixation portion 28 does not block the airflow from the blower fan 201.

According to the present embodiment, as shown in FIGS. 15, 17, the second case guide portion 192 has the first groove 281a recessed in a direction intersecting the fan axis CL1 and extending in the first radial direction D1r. The first guided portion 281 has a first protrusion 281b that fits into the first groove 281a. The second cover guide portion 262 has the second groove 282a recessed in the direction intersecting the fan axis CL1 and extending in the first radial direction D1r. The second guided portion 282 has a second protrusion 282b that fits into the second groove 282a. Accordingly, when the first guided portion 281 is guided by the second case guide portion 192 as the blower 20 moves in the first radial direction D1r, the first protrusion 281b is fitted into the first groove 281a and moves in the first radial direction D1r. That is, in this case, the first guided portion 281 moves in the first radial direction D1r relative to the second case guide portion 192 with the first protrusion 281b fitted into the first groove 281a. Similarly, when the second guided portion 282 is guided by the second cover guide portion 262 as the blower 20 moves in the first radial direction D1r, the second protrusion 282b moves in the first radial direction D1*r* with the second protrusion 282*b* fitted into the second groove 282*a*. That is, in this case, the second guided portion 282 moves in the first radial direction D1*r* relative to the second cover guide portion 262 with the second protrusion 282*b* fitted into the second groove 282*a*.

Accordingly, when replacing the blower by removing the first opening hole cover 14, the blower 20 can be guided along the first radial direction D1*r* with the blower 20 immovable in the fan axial direction DRa.

According to the present embodiment, as shown in FIGS. 16, 18, the first case guide portion 191 has the third groove 283*a* recessed in a direction intersecting the fan axis CL1 and extending in the second radial direction D2*r*. The third guided portion 283 has a third protrusion 283*b* that fits into the third groove 283*a*. The first cover guide portion 142 has the fourth groove 284*a* recessed in the direction intersecting the fan axis CL1 and extending in the second radial direction D2*r*. The fourth guided portion 284 has a fourth protrusion 284*b* that fits into the fourth groove 284*a*. Accordingly, when the third guided portion 283 is guided by the first case guide portion 191 as the blower 20 moves in the second radial direction D2*r*, the third protrusion 283*b* is fitted into the third groove 283*a* and moves in the second radial direction D2*r*. That is, in this case, the third guided portion 283 moves in the second radial direction D2*r* relative to the first case guide portion 191 with the third protrusion 283*b* fitted into the third groove 283*a*. Similarly, when the fourth guided portion 284 is guided by the first cover guide portion 142 as the blower 20 moves in the second radial direction D2*r*, the fourth protrusion 284*b* is fitted into the fourth groove 284*a* and moves in the second radial direction D2*r*. That is, in this case, the fourth guided portion 284 moves in the second radial direction D2*r* relative to the first cover guide portion 142 with the fourth protrusion 284*b* fitted into the fourth groove 284*a*.

Accordingly, when replacing the blower 20 by removing the second opening hole cover 26, the blower 20 can be guided along the second radial direction D2*r* with the blower 20 immovable in the fan axial direction DRa.

According to the present embodiment, as shown in FIGS. 17, 18, the first to fourth protrusions 281*b*-284*b* are formed in the guided portions 281-284 of the motor fixation portion 28 respectively. The first to fourth grooves 281*a*-284*a* are formed in the guide portions 192, 262, 191, 142 each of which corresponds to the respective guided portions 281-284. That is, ones of the guided portions 281-284 or the guide portions 192, 262, 191, 142 have ones of the protrusions 281*b*-284*b* or the grooves 281*a*-284*a*. The others of the guided portions 281-284 or the guide portions 192, 262, 191, 142 have the others of the protrusions 281*b*-284*b* or the grooves 281*a*-284*a*. That is, the guided portions 281-284 only have ones of the protrusions 281*b*-284*b* or the grooves 281*a*-284*a*, and the guide portions 192, 262, 191, 142 only have the others of protrusions 281*b*-284*b* or the grooves 281*a*-284*a*.

Accordingly, the structure for guiding the motor fixation portion 28 in the first radial direction D1*r* or the second radial direction D2*r* is easily formed at boundaries between the guided portions 281-284 connected to each other, and at boundaries between the guide portions 192, 262, 191, 142 connected to each other.

Aside from the above described aspects, the present embodiment is the same as the first embodiment. Further, in the present embodiment, the same effects as the first embodiment described above can be obtained in the same manner as in the first embodiment.

Seventh Embodiment

A seventh embodiment is described next. The present embodiment will be explained primarily with respect to portions different from those of the sixth embodiment.

Figure 20:
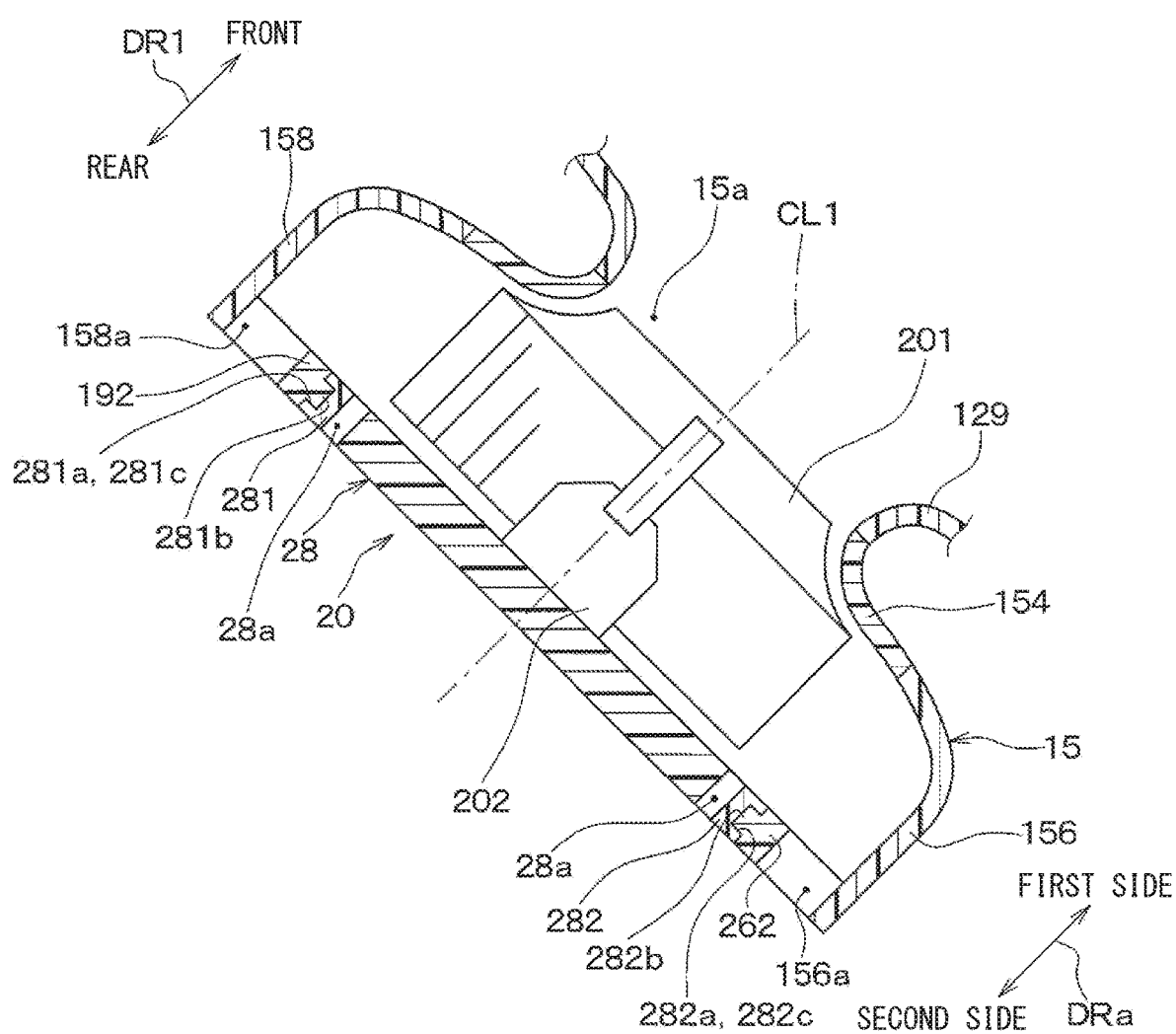
FIG. 20 is a cross-sectional diagram showing a cross-section corresponding to the cross-section taken along XVII-XVII line of FIG. 14, and corresponding to FIG. 17 according to at least one embodiment.
Figure 21:
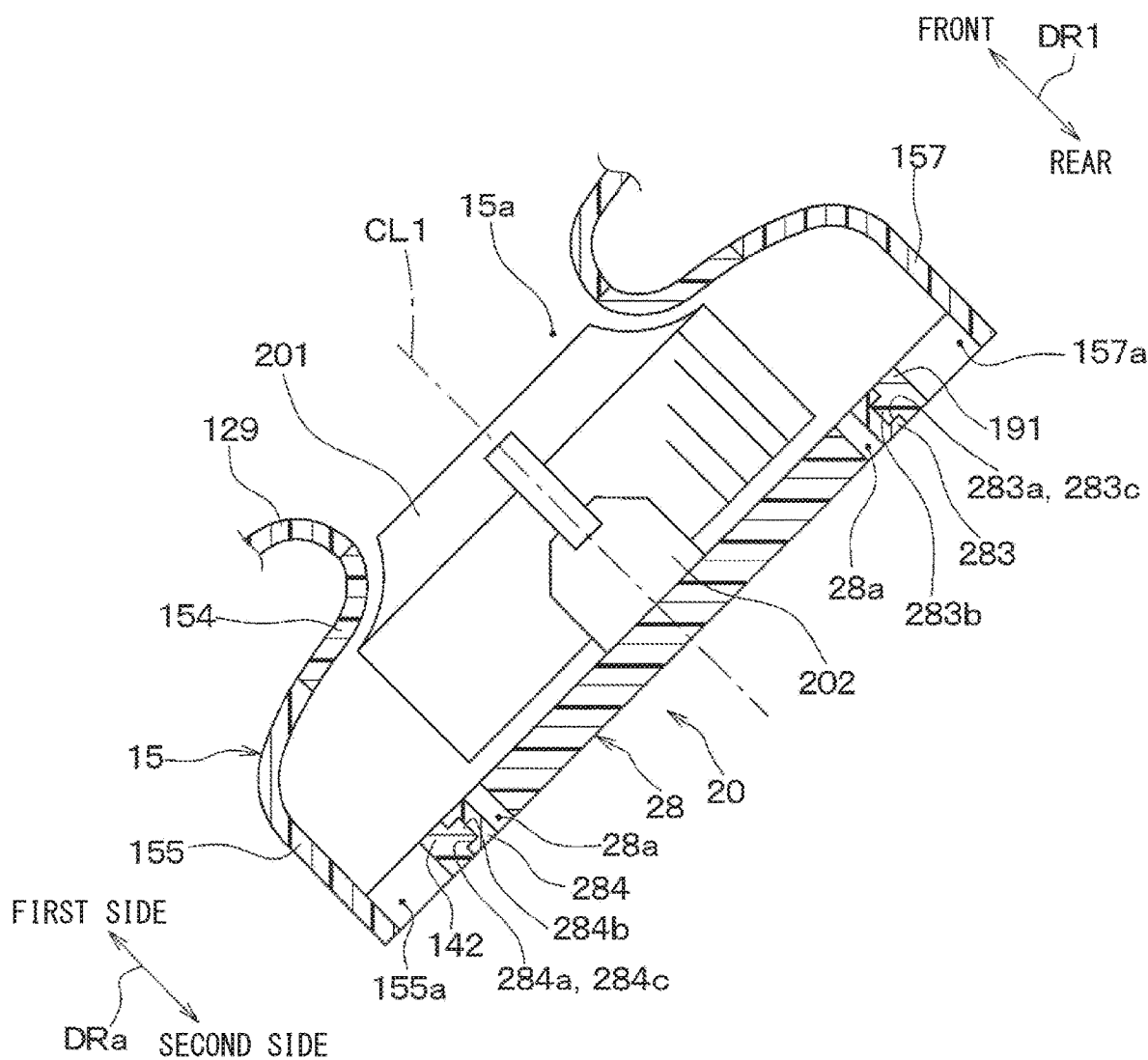
FIG. 21 is a cross-sectional diagram showing a cross-section corresponding to the cross-section taken along XVIII-XVIII line of FIG. 14, and corresponding to FIG. 18 according to at least one embodiment.

In the present embodiment, a part in which the first to fourth grooves 281*a*, 282*a*, 283*a*, 284*a* are formed and a part in which the first to fourth protrusions 281*b*, 282*b*, 283*b*, 284*b* are formed are swapped as compared to the sixth embodiment, as shown in FIGS. 20, 21. Hereinafter, the first to fourth grooves 281*a*, 282*a*, 283*a*, 284*a* may be abbreviated to the first to fourth grooves 281*a*-284*a*. Further, the first to fourth protrusions 281*b*, 282*b*, 283*b*, 284*b* may be abbreviated to the first to fourth protrusions 281*b*-284*b*.

Specifically, the first groove 281*a* is formed in the first guided portion 281, and the first protrusion 281*b* configured to be fitted into the first groove 281*a* is formed in the second case guide portion 192. The second groove 282*a* is formed in the second guided portion 282, and the second protrusion 282*b* configured to be fitted into the second groove 282*a* is formed in the second cover guide portion 262. The third groove 283*a* is formed in the third guided portion 283, and the third protrusion 283*b* configured to be fitted into the third groove 283*a* is formed in the first case guide portion 191. The fourth groove 284*a* is formed in the fourth guided portion 284, and the fourth protrusion 284*b* configured to be fitted into the fourth groove 284*a* is formed in the first cover guide portion 142.

Aside from the above described aspects, the present embodiment is the same as the sixth embodiment. Further, in the present embodiment, effects similar to those of the sixth embodiment described above can be obtained in the same manner as in the sixth embodiment.

Eighth Embodiment

An eighth embodiment is described next. The present embodiment will be explained primarily with respect to portions different from those of the sixth embodiment.

Figure 22:
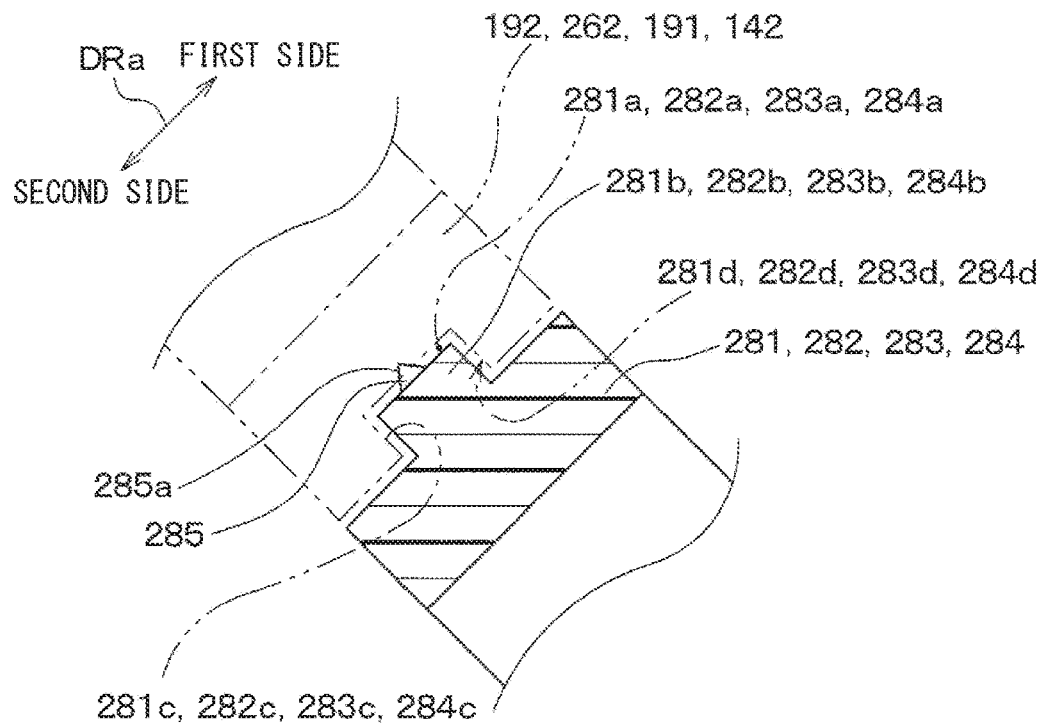
FIG. 22 is a schematically enlarged cross-sectional diagram illustrating XXII part of FIG. 17 according to at least one embodiment.

In the present embodiment, the first protrusion 281*b* has a protrusion side protrusion 285 that partially protrudes from the first protrusion 281*b* as shown in FIG. 22. For example, the protrusion side protrusion 285 further protrudes from a top of the first protrusion 281*b* in a direction in which the first protrusion 281*b* protrudes. The cross-section of the protrusion side protrusion 285 has a triangular shape tapered toward the tip of the protrusion side protrusion 285. For example, although the protrusion side protrusion 285 is a part of the first guided portion 281, the protrusion side protrusion 285 is molded integrally with a part of the first guided portion 281 around the protrusion side protrusion 285 such as the first protrusion 281*b*.

In a condition where the blower 20 is mounted in the air-conditioning case 12, the protrusion side protrusion 285 is pressed by a first groove defining portion 281*d* that defines the first groove 281*a*. The first groove defining portion 281*d* is a part of the second case guide portion 192. In FIG. 22, a shape of the protrusion side protrusion 285 that is not pressed is illustrated. This is the same in the following drawings in which a cross section similar to that in FIG. 22 is illustrated.

Specifically, a part 285*a* of the protrusion side protrusion 285 that overlaps the first groove defining portion 281*d* when the first protrusion 281*b* is fitted into the first groove 281*a* is pressed by the first groove defining portion 281*d*. In the present embodiment, the protrusion side protrusion 285 is pressed by the first groove defining portion 281*d* in a direction perpendicular to the fan axis CL1 (specifically, the second radial direction D2*r*).

In FIG. 22, the protrusion side protrusion 285 of the first protrusion 281*b* is illustrated. As in the first protrusion 281*b*, the second to fourth protrusions 282*b*, 283*b*, 284*b* have protrusion side protrusions 285 respectively.

That is, the protrusion side protrusion 285 formed on the second protrusion 282*b* is pressed by a second groove defining portion 282*d* that defines the second groove 282*a*. The protrusion side protrusion 285 formed on the third protrusion 283*b* is pressed by a third groove defining portion 283*d* that defines the third groove 283*a*. The protrusion side protrusion 285 formed on the fourth protrusion 284*b* is pressed by a fourth groove defining portion 284*d* that defines the fourth groove 284*a*.

Multiple protrusion side protrusions 285 are formed at predetermined intervals throughout the first to fourth guided portions 281, 282, 283, 284, for example.

Although FIG. 22 is a cross-sectional diagram in which XXII part of FIG. 17 is enlarged, reference numerals of parts in XXIIa part of FIG. 17, XXIIb part of FIG. 18, and XXIIc part of FIG. 18 are also illustrated in FIG. 22. XXIIa part, XXIIb part, and XXIIc part are also described with reference to FIG. 22.

In FIG. 22, a gap between the first guided portion 281 and the second case guide portion 192 is intentionally enlarged in comparison with the actual size in order to make it easy to see. This is the same in the following drawings in which a cross section similar to that in FIG. 22 is illustrated.

In the present embodiment, the first to fourth protrusions 281*b*-284*b* having the protrusion side protrusions 285 are collectively referred to as predetermined protrusions. Further, one of the first to fourth groove 281*a*-284*a* into which the predetermined protrusion is fitted is referred to as a predetermined groove, and one of the first to fourth groove defining portion 281*d*-284*d* that defines the predetermined groove is referred to as a predetermined groove defining portion.

As described above, the protrusion side protrusion 285 is formed in at least one predetermined protrusion of the first to fourth protrusions 281*b*-284*b* as shown in FIG. 22. The protrusion side protrusion 285 is pressed by the predetermined groove defining portion 281*d*-284*d* that defines the predetermined groove in the first to fourth groove 281*a*-284*a* into which the predetermined protrusion is fitted. Accordingly, the protrusion side protrusions 285 limit a relative motion of the blower 20 to the case body 13, and thereby noise and vibration wear can be limited. As a result, it is possible to prevent the occupant from being uncomfortable due to the noise and vibration.

According to the present embodiment, the protrusion side protrusions 285 formed in the first to fourth protrusions 281*b*-284*b* are pushed by the predetermined groove defining portions 281*d*-284*d* in a direction perpendicular to the fan axis CL1. Accordingly, the protrusion side protrusions 285 formed on one predetermined protrusion can limit a motion of the blower 20 in a direction in which the protrusion side protrusion 285 is pressed, i.e. the direction perpendicular to the fan axis CL1. Since the protrusion side protrusions 285 are respectively provided in the first to fourth protrusions 281*b*-284*b*, the motion of the blower 20 in each of the first radial direction D1*r* and the second radial direction D2*r* can be limited.

According to the present embodiment, since each protrusion side protrusion 285 is formed in the motor fixation portion 28, the protrusion side protrusions 285 are formed in the blower 20 in the case body 13 and the blower 20. Accordingly, when replacing the protrusion side protrusions 285 at the same time when replacing the blower 20, all of the protrusion side protrusions 285 can be replaced by removing the blower 20 from the case body 13.

Aside from the above described aspects, the present embodiment is the same as the sixth embodiment. Further, in the present embodiment, effects similar to those of the sixth embodiment described above can be obtained in the same manner as in the sixth embodiment.

Note that the present embodiment is a modification based on the sixth embodiment, but it is possible to combine the present embodiment with the seventh embodiment described above.

Ninth Embodiment

A ninth embodiment is described next. The present embodiment will be explained primarily with respect to portions different from those of the eighth embodiment.

Figure 23:
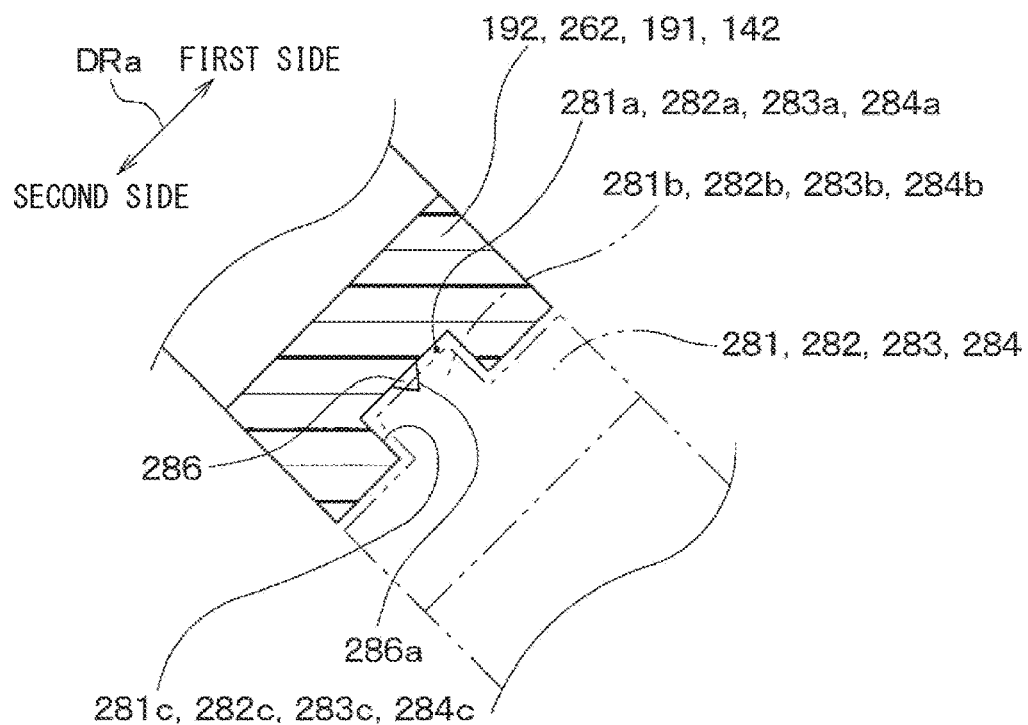
FIG. 23 is a schematically enlarged cross-sectional diagram illustrating XXII part of FIG. 17 according to at least one embodiment, and corresponding to FIG. 22.

In the present embodiment, as shown in FIG. 23, groove side protrusions 286 are provided instead of the protrusion side protrusions 285 of the eighth embodiment. The groove side protrusion 286 of the present embodiment is the same as the protrusion side protrusion 285 of the eighth embodiment excepting its position.

Specifically, the groove side protrusion 286 is located in the first groove 281*a* and partially protrudes from the wall surface 281*c* of the first groove 281*a*. In the present embodiment, the groove side protrusion 286 protrudes from the bottom surface of the wall surface 281*c* of the first groove 281*a*. For example, although the groove side protrusion 286 is a part of the second case guide portion 192, the groove side protrusion 286 is molded integrally with a part of the second case guide portion 192 around the groove side protrusion 286 such as a part defining the first groove 281*a*.

In a condition where the blower 20 is mounted in the air-conditioning case 12, the groove side protrusion 286 is pressed by the first protrusion 281*b*. In FIG. 23, a shape of the groove side protrusion 286 that is not pressed is illustrated, like the protrusion side protrusion 285 illustrated in FIG. 22. This is the same in the following drawings in which a cross section similar to that in FIG. 23 is illustrated.

Specifically, a part 286*a* of the groove side protrusion 286 that overlaps the first protrusion 281*b* when the first protrusion 281*b* is fitted into the first groove 281*a* is pressed by the first protrusion 281*b*. In the present embodiment, the groove side protrusion 286 is pressed by the first protrusion 281*b* in a direction perpendicular to the fan axis CL1 (specifically, the second radial direction D2*r*).

Although the groove side protrusion 286 located in the first groove 281*a* is illustrated in FIG. 23, the groove side protrusions 286 are formed in the second to fourth grooves 282*a*, 283*a*, 284*a* respectively, as in the first groove 281*a*.

That is, the groove side protrusion 286 located in the second groove 282*a* is pressed by the second protrusion 282*b*. The groove side protrusion 286 located in the third groove 283*a* is pressed by the third protrusion 283*b*. The groove side protrusion 286 located in the fourth groove 284*a* is pressed by the fourth protrusion 284*b*.

Multiple groove side protrusions 286 in the first groove 281*a* are formed at predetermined intervals throughout the second case guide portion 192, for example. The same applies to the groove side protrusions 286 provided in the second to fourth grooves 282*a*, 283*a*, 284*a*.

In FIG. 23, reference numerals of parts in XXIIa part of FIG. 17, XXIIb part of FIG. 18, and XXIIc part of FIG. 18 are illustrated in addition to reference numerals of parts in XXII part of FIG. 17 as in FIG. 22.

In the present embodiment, the first to fourth grooves 281a-284a having the groove side protrusions 286 are collectively referred to as predetermined grooves. Further, the protrusion in the first to fourth protrusions 281b-284b that is fitted into the predetermined groove is referred to as the predetermined protrusion.

As described above, according to the predetermined embodiment, the groove side protrusion 286 is formed in at least one predetermined groove of the first to fourth grooves 281a-284a as shown in FIG. 23. The groove side protrusion 286 is pressed by the predetermined protrusion in the first to fourth protrusions 281b-284b that fits into the predetermined groove. Accordingly, the groove side protrusions 286 limit a relative motion of the blower 20 to the case body 13, and thereby noise and vibration wear can be limited. As a result, it is possible to prevent the occupant from being uncomfortable due to the noise and vibration.

According to the present embodiment, the groove side protrusions 286 are pressed by the predetermined protrusions 281b-284b in a direction perpendicular to the fan axis CL1. Accordingly, groove side protrusions 286 located in one predetermined groove can limit a motion of the blower 20 in a direction in which the groove side protrusions 286 are pressed, i.e. the direction perpendicular to the fan axis CL1. Since the groove side protrusions 286 are respectively provided in the first to fourth grooves 281a-284a, the motion of the blower 20 in each of the first radial direction D1r and the second radial direction D2r can be limited as in the eighth embodiment.

Aside from the above described aspects, the present embodiment is the same as the eighth embodiment. Further, in the present embodiment, effects similar to those of the eighth embodiment described above can be obtained in the same manner as in the eighth embodiment.

Tenth Embodiment

A tenth embodiment is described next. The present embodiment will be explained primarily with respect to portions different from those of the eighth embodiment.

Figure 24:
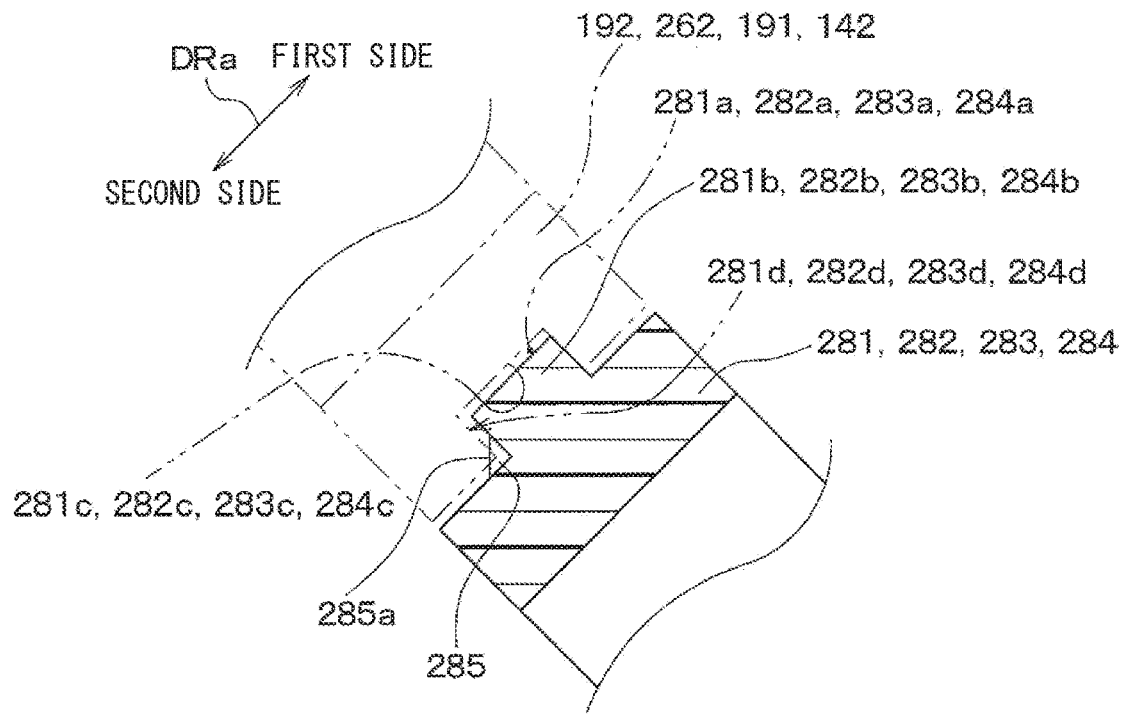
FIG. 24 is a schematically enlarged cross-sectional diagram illustrating XXII part of FIG. 17 according to at least one embodiment, and corresponding to FIG. 22.

In the present embodiment, a position of the protrusion side protrusion 285 is different from the position of the protrusion side protrusion 285 of the eighth embodiment as shown in FIG. 24.

The protrusion side protrusion 285 is located on a lateral side of the first protrusion 281b. Specifically, the protrusion side protrusion 285 is located on a base part of the first protrusion 281b and on a second side of the first protrusion 281b in the fan axial direction DRa. Accordingly, the protrusion side protrusion 285 is pressed by the first groove defining portion 281d in the fan axial direction DRa and the direction perpendicular to the fan axis CL1.

The protrusion side protrusions 285 are provided on lateral sides of the second to fourth protrusions 282b-284b respectively as in the first protrusion 281b.

In the present embodiment, the protrusion side protrusions 285 are provided on the lateral sides of the first to fourth protrusions respectively, the first to fourth protrusions 281b-284b may be referred to as predetermined protrusions. In this case, the protrusion side protrusions 285 located on the lateral sides of the predetermined protrusions are pressed by the predetermined groove defining portion 281d-284d in the fan axial direction DRa and the direction perpendicular to the fan axis CL1. Accordingly, protrusion side protrusions 285 provided on one predetermined protrusion can limit a motion of the blower 20 in the directions in which the predetermined protrusion 285 is pressed. Since the protrusion side protrusions 285 are respectively provided in the first to fourth protrusions 281b-284b, the motion of the blower 20 in each of the first radial direction D1r, the second radial direction D2r, and the fan axial direction DRa can be limited.

Aside from the above described aspects, the present embodiment is the same as the eighth embodiment. Further, in the present embodiment, effects similar to those of the eighth embodiment described above can be obtained in the same manner as in the eighth embodiment.

Eleventh Embodiment

An eleventh embodiment is described next. The present embodiment will be explained primarily with respect to portions different from those of the ninth embodiment.

Figure 25:
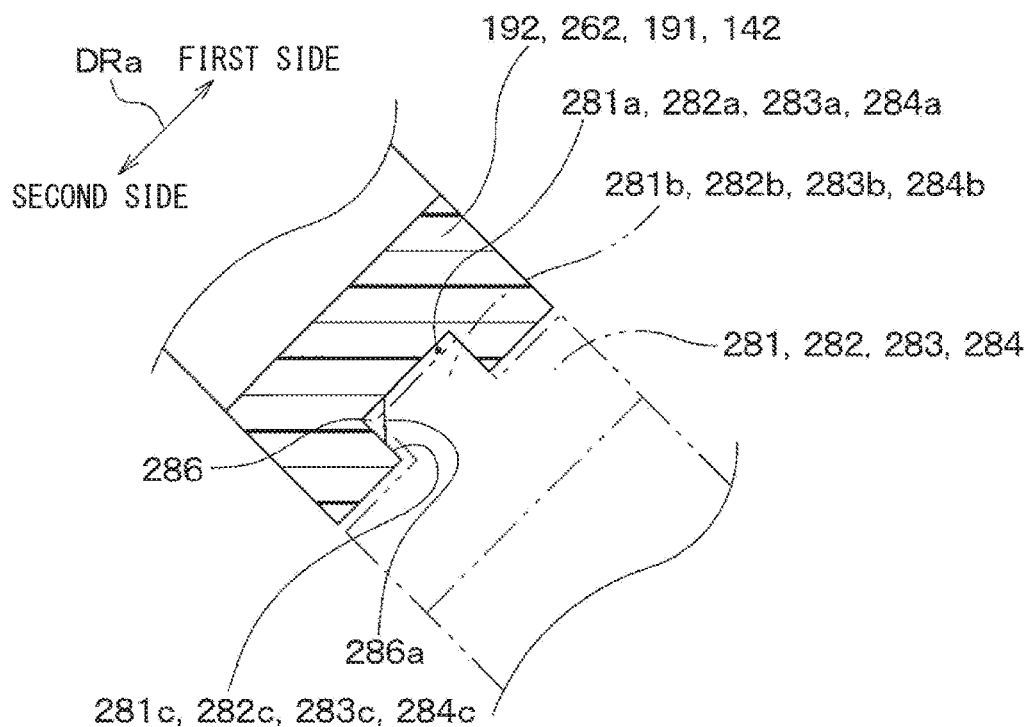
FIG. 25 is a schematically enlarged cross-sectional diagram illustrating XXII part of FIG. 17 according to at least one embodiment, and corresponding to FIG. 22.
Figure 26:
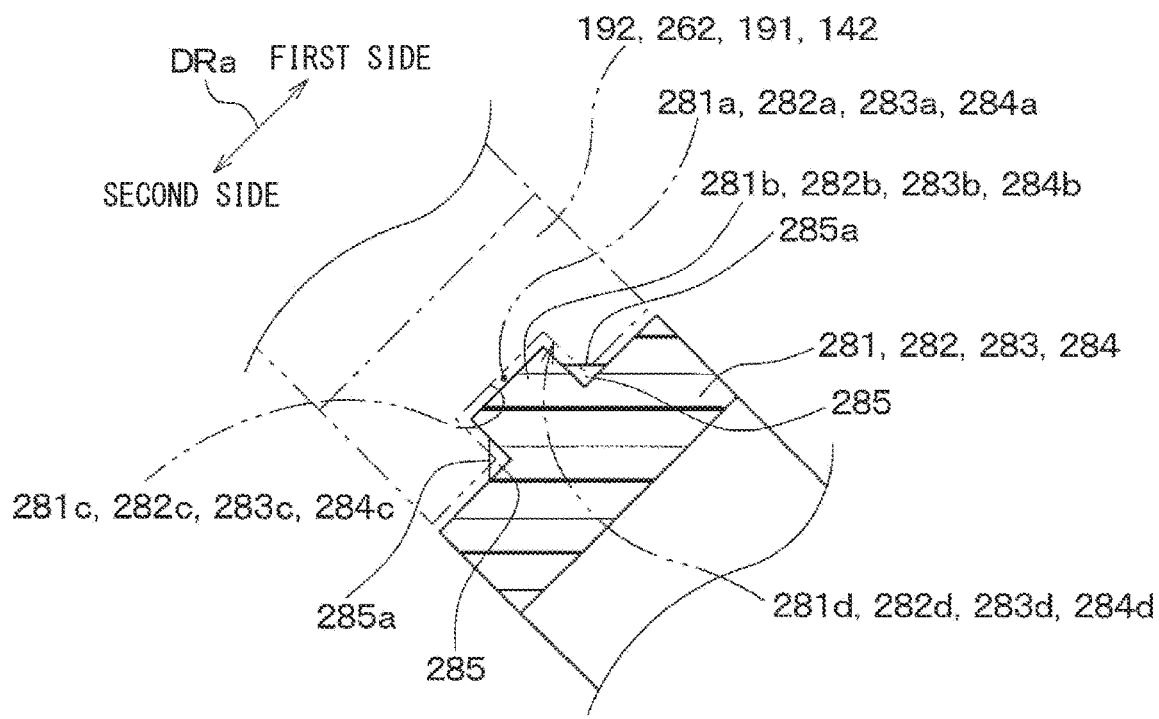
FIG. 26 is a schematically enlarged cross-sectional diagram illustrating XXII part of FIG. 17 according to at least one embodiment, and corresponding to FIG. 22.
Figure 27:
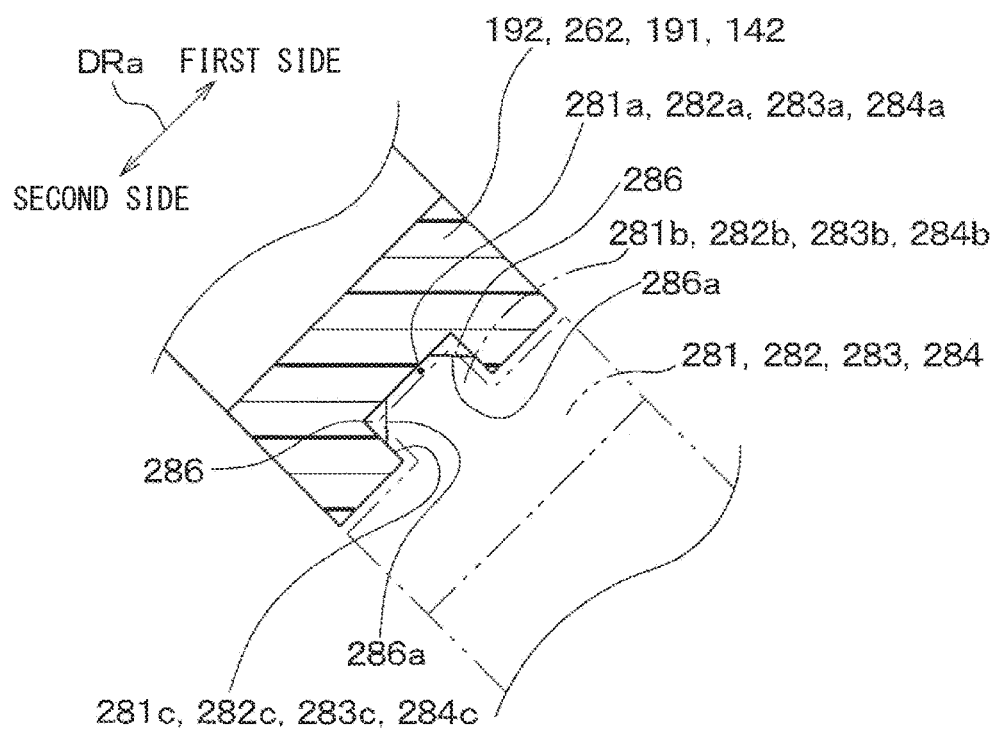
FIG. 27 is a schematically enlarged cross-sectional diagram illustrating XXII part of FIG. 17 according to at least one embodiment, and corresponding to FIG. 22.

In the present embodiment, a position of the groove side protrusion 286 is different from the position of the groove side protrusion 286 of the ninth embodiment as shown in FIG. 25.

In the present embodiment, the groove side protrusion 286 is located on a corner of the first groove 281a at which the bottom surface and the lateral surface of the wall surface 281c are connected with each other. That is, the groove side protrusion 286 protrudes from both the bottom surface and the lateral surface of the wall surface 281c.

Specifically, the groove side protrusion 286 is provided at a corner at which the bottom surface is connected to the lateral surface of the wall surface 281c of the first groove 281a located on the second side in the fan axial direction DRa. The groove side protrusion 286 is not provided on another corner at which the bottom surface and the lateral surface located on the first side are connected with each other. According to such position of the groove side protrusion 286, the groove side protrusion 286 is pressed by the first protrusion 281b in the fan axial direction DRa and the direction perpendicular to the fan axis CL1.

The groove side protrusions 286 are respectively provided in the second to fourth grooves 282a-284a as in the first groove 281a.

According to the present embodiment, the groove side protrusions 286 are pressed by the predetermined protrusions 281b-284b in each of the fan axial direction DRa and a direction perpendicular to the fan axis CL1. Accordingly, the groove side protrusions 286 provided in one of the predetermined groove in the first to fourth grooves 281a-284a can limit a motion of the blower 20 in the directions in which the predetermined protrusion 286 is pressed. Since the groove side protrusions 286 are respectively provided in the first to fourth grooves 281a-284a, the motion of the blower 20 in each of the first radial direction D1r, the second radial direction D2r, and the fan axial direction DRa can be limited.

Aside from the above described aspects, the present embodiment is the same as the ninth embodiment. Further, in the present embodiment, effects similar to those of the ninth embodiment described above can be obtained in the same manner as in the ninth embodiment.

Twelfth Embodiment

A twelfth embodiment is described next. The present embodiment will be explained primarily with respect to portions different from those of the tenth embodiment.

In the present embodiment, the protrusion side protrusion 285 is provided on the first side of the base part of the first protrusion 281b in the fan axial direction DRa as well as on the second side.

Although the protrusion side protrusions 285 formed on the first protrusion 281b are described above, the protrusion side protrusions 285 are also formed on the second to fourth protrusions 282b-284b as in the first protrusion 281b.

Aside from the above described aspects, the present embodiment is the same as the tenth embodiment. Further, in the present embodiment, effects similar to those of the tenth embodiment described above can be obtained in the same manner as in the tenth embodiment.

Thirteenth Embodiment

A thirteenth embodiment is described next. The present embodiment will be explained primarily with respect to portions different from those of the eleventh embodiment.

In the present embodiment, the groove side protrusion 286 is provided at a corner at which the lateral surface of the wall surface 281c of the first groove 281a located on the second side in the fan axial direction DRa. The groove side protrusion 286 is also formed at another corner at which the bottom surface and the lateral surface located on the first side are connected with each other.

Although the position of the groove side protrusion 286 is described above, the groove side protrusion 286 is also provided in each of the second to fourth grooves 282a-284a as in the first groove 281a.

Aside from the above described aspects, the present embodiment is the same as the eleventh embodiment. Further, in the present embodiment, effects similar to those of the eleventh embodiment described above can be obtained in the same manner as in the eleventh embodiment.

Fourteenth Embodiment

A fourteenth embodiment is described next. The present embodiment will be explained primarily with respect to portions different from those of the tenth embodiment.

Figure 28:
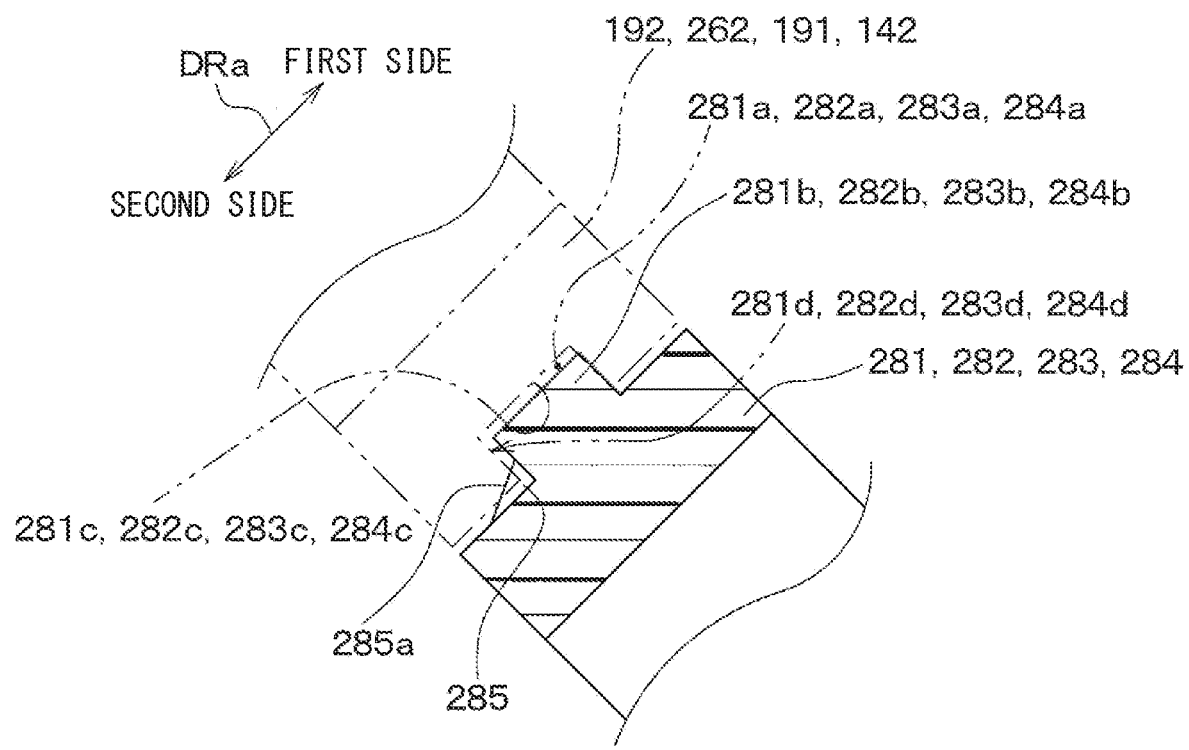
FIG. 28 is a schematically enlarged cross-sectional diagram illustrating XXII part of FIG. 17 according to at least one embodiment, and corresponding to FIG. 22.

In the present embodiment, the protrusion side protrusion 285 of the present embodiment is provided as in the tenth embodiment as shown in FIG. 28. The protrusion side protrusion 285 of the present embodiment is a separated component from parts around the protrusion side protrusion 285 such as the first protrusion 281b of the first guided portion 281, and the protrusion side protrusion 285 is fixed to parts around the protrusion side protrusion 285.

The configuration of the protrusion side protrusion 285 located on the side of the first protrusion 281b is described above, the protrusion side protrusion 285 is also provided on a side of each of second to fourth protrusions 282b-284b in the same manner.

Since the protrusion side protrusion 285 is provided as a separated component, the parts on which the protrusion side protrusion 285 is provided can be formed easily, and fine adjustments for reducing looseness in the blower 20 can be easily performed. Further, the protrusion side protrusion 285 can be more freely arranged.

Aside from the above described aspects, the present embodiment is the same as the tenth embodiment. Further, in the present embodiment, effects similar to those of the tenth embodiment described above can be obtained in the same manner as in the tenth embodiment.

Fifteenth Embodiment

A fifteenth embodiment is described next. The present embodiment will be explained primarily with respect to portions different from those of the sixth embodiment.

Figure 29:
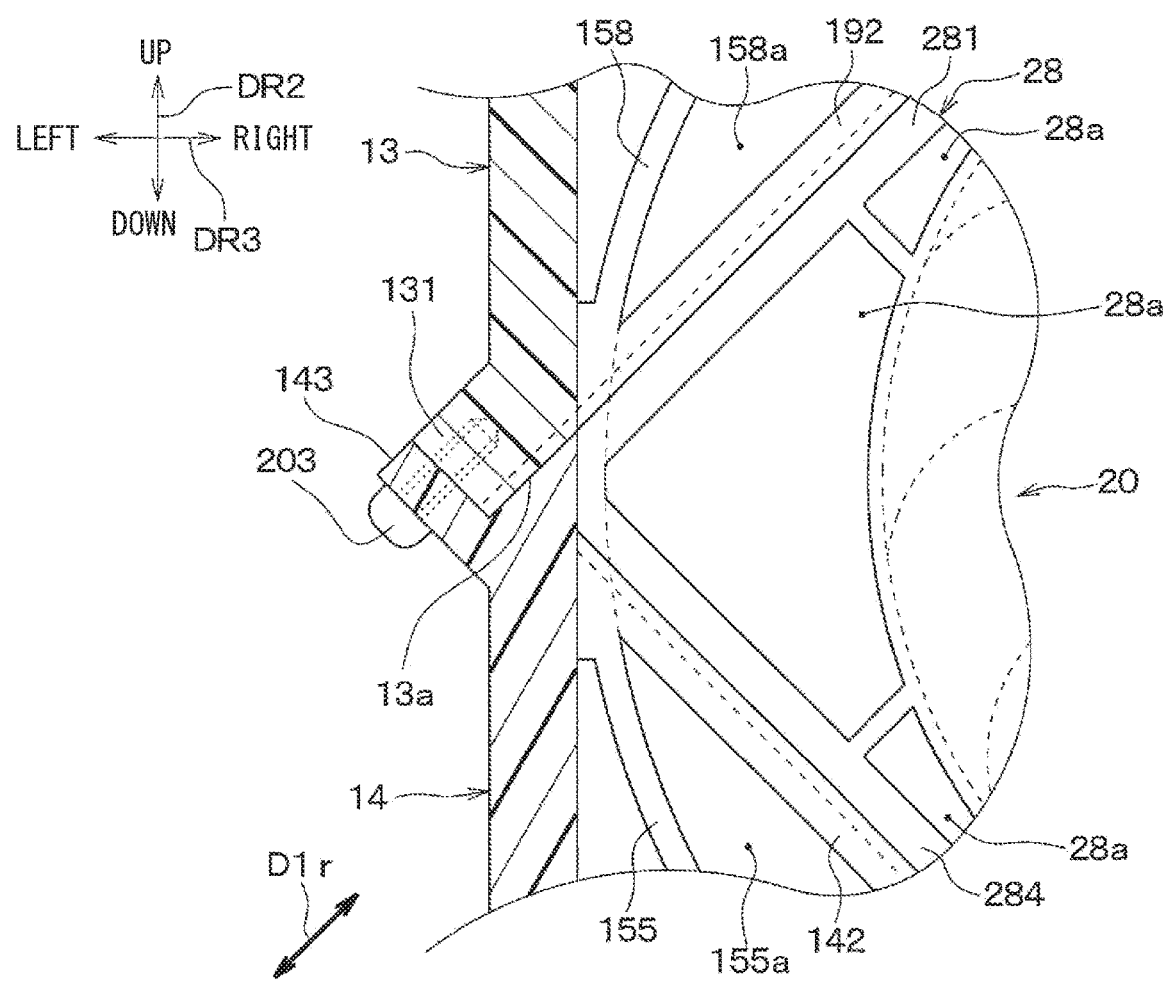
FIG. 29 is a schematically enlarged cross-sectional diagram illustrating XXIX part of FIG. 14 according to at least one embodiment.

In the present embodiment, the air-conditioning case 12 includes a screw 203 as a cover fixation portion for fixing the first opening hole cover 14 to the case body 13, as shown in FIG. 29.

The case body 13 has a screw receiving portion 131 into which the screw 203 is inserted in a part located in a vicinity of the first case opening hole 13a. The first opening hole cover 14 has a screw seat 143 formed to overlap the screw receiving portion 131 in the first radial direction D1r, and the screw seat 143 has a screw through-hole through for inserting the screw 203.

The screw 203 is inserted into the screw through-hole of the screw seat 143 and the screw receiving portion 131. For example, the screw 203 is inserted into the screw receiving portion 131 in the first radial direction D1r. The first opening hole cover 14 is fixed to the case body 13 by the screw 203.

The second opening hole cover 26 is also fixed to the case body 13 by the screw 203, similarly to the first opening hole cover 14.

When the first opening hole cover 14 is detached from the case body 13, the first opening hole cover 14 is removed from the case body 13 after unscrewing the screw 203. Similarly, when the second opening hole cover 26 is detached from the case body 13, the second opening hole cover 26 is removed from the case body 13 after unscrewing the screw 203.

The first opening hole cover 14 may be fixed to the case body 13 by screw 203 at one part or multiple parts. This is the same for the second opening hole cover 26.

As described above, according to the present embodiment, the first opening hole cover 14 is fixed to the case body 13 by the screw 203. Accordingly, the first opening hole cover 14 is prevented from unintentionally being detached, and rattles between the blower 20 and the first opening hole cover 14 can be suppressed.

Aside from the above described aspects, the present embodiment is the same as the sixth embodiment. Further, in the present embodiment, effects similar to those of the sixth embodiment described above can be obtained in the same manner as in the sixth embodiment.

The present embodiment is a modification based on the sixth embodiment and can also be combined with any of the seventh to the fourteenth embodiments described above.

Sixteenth Embodiment

A sixteenth embodiment is described next. The present embodiment will be explained primarily with respect to portions different from those of the fifteenth embodiment.

Figure 30:
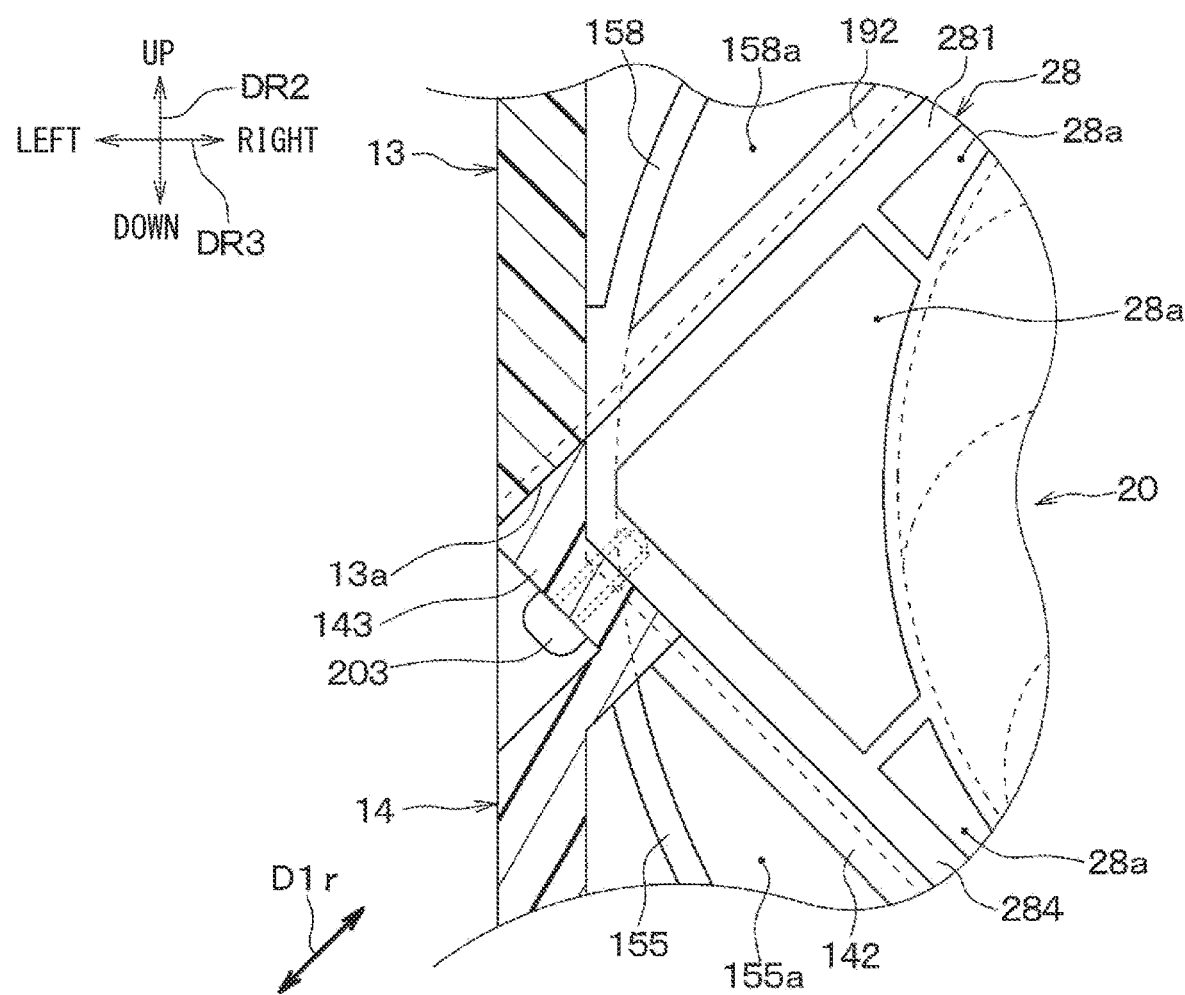
FIG. 30 is a schematically enlarged cross-sectional diagram illustrating XXIX part of FIG. 14 according to at least one embodiment, and corresponding to FIG. 29.

In the present embodiment, the case body 13 does not include the screw receiving portion 131 (see FIG. 29) as shown in FIG. 30. The screw 203 is inserted not into the screw receiving portion but into a part of the motor fixation portion 28.

That is, the screw 203 of the present embodiment is inserted into the screw through-hole of the screw seat 143 and a part of the motor fixation portion 28. According to the present embodiment, the screw 203 is inserted into the motor fixation portion 28 in the first radial direction D1r, for example. In the present embodiment, the first opening hole cover 14 is fixed to the blower 20 having the motor fixation portion 28 by the screw 203.

The second opening hole cover 26 is also fixed to the blower 20 by the screw 203, similarly to the first opening hole cover 14.

When the first opening hole cover 14 is detached from the case body 13, the first opening hole cover 14 is removed from the case body 13 after unscrewing the screw 203. Alternatively, the blower 20 may be taken out from the air-conditioning case 12 at the same time when removing the first opening hole cover 14 from the case body 13 without unscrewing the screw 203, as long as the first opening hole cover 14 and the blower 20 are detachable together with each other.

Similarly, when the second opening hole cover 26 is detached from the case body 13, the second opening hole cover 26 is removed from the case body 13 after unscrewing the screw 203. Alternatively, the blower 20 may be taken out from the air-conditioning case 12 at the same time when removing the second opening hole cover 26 from the case body 13 without unscrewing the screw 203, as long as the second opening hole cover 26 and the blower 20 are detachable together with each other.

The first opening hole cover 14 may be fixed to the blower 20 by screw 203 at one part or multiple parts. This is the same for the second opening hole cover 26.

As described above, according to the present embodiment, the first opening hole cover 14 is fixed to the blower 20 by the screw 203. Accordingly, the first opening hole cover 14 is prevented from unintentionally being detached, and rattles between the blower 20 and the first opening hole cover 14 can be suppressed.

Aside from the above described aspects, the present embodiment is the same as the fifteenth embodiment. Further, in the present embodiment, effects similar to those of the fifteenth embodiment described above can be obtained in the same manner as in the fifteenth embodiment.

Other Embodiments (1) In each of the embodiments described above, for example, as shown in FIG. 1, the blower fan 201 is the centrifugal fan, but is not limited thereto, and may be an axial fan or a mixed flow fan, for example.

(2) In the above-described first embodiment, the opening hole cover 14, the detachable portion 151 of the fan cover 15, and the blower 20 are taken out from the air-conditioning case 12 downward. However, this is just an example. The blower 20 and the like may be taken out in a direction other than downward (e.g. upward) as long as they are taken out from the air-conditioning case 12 in the fan radial direction. The same also applies to the second and subsequent embodiments.

When the blower 20 and the like are taken out in the fan radial direction during the replacement of the blower, it is acceptable that the blower 20 and the like move in a direction other than the fan radial direction to some extent. For example, it can be assumed that it is necessary to move the blower 20 and the like in a direction other than the fan radial direction in order to avoid rubbing with and catching on the case body 13 and to omit a step for filling a gap.

(3) In the above-described embodiments, the case opening hole 13a opens in the fan radial direction as shown in FIGS. 2, 3. However, the case opening hole 13a may open in a direction slightly tilted with respect to the fan radial direction.

(4) In the above-described sixth embodiment, the second radial direction D2r is perpendicular to the first radial direction D1r as shown in FIG. 14. However, the second radial direction D2r may be a direction that is not perpendicular to the first radial direction D1r.

(5) In the above-described sixth embodiment, the motor fixation portion 28 viewed along the fan axial direction DRa has a substantially square shape as shown in FIG. 14. However, the shape of the motor fixation portion 28 is not limited to the square shape. The shape may be a polygon such as rhombus, for example, as long as the blower 20 can be taken out of the air-conditioning case 12.

(6) In the above-described sixth embodiment, the guided portions 281-284 have ones of the protrusions 281b-284b or the grooves 281a-284a, and the guide portion 192, 262, 191, 142 the other ones of the protrusions 281b-284b or the grooves 281a-284a as shown in FIGS. 17, 18. However, this is just an example. Some of the protrusions 281b-284b and some of the grooves 281a-284a may be formed in ones of the guided portions 281-284 or the guide portions 192, 262, 191, 142, and the remaining protrusions 281b-284b and the remaining grooves 281a-284a may be formed in the other ones of the guided portions 281-284 or the guide portions 192, 262, 191, 142.

(7) In the above-described sixth embodiment, the first radial direction D1r and the second radial direction D2r are symmetrical to each other in the width direction DR3 of the vehicle as shown in FIGS. 15, 16. However, this is just an example. The first radial direction D1r and the second radial direction D2r may be left-right asymmetric. That is, the first radial direction D1r and the second radial direction D2r are not limited as long as the obstacles does not interfere with the blower 20 when taking out the blower 20 from the air-conditioning case 12 in the first radial direction D1r or the second radial direction D2r.

Since the first radial direction D1r and the second radial direction D2r may be left-right asymmetric, the guided portion 281-284 and the guide portions 192, 262, 191, 142 may also be left-right asymmetric.

(8) In the above-described sixth embodiment, the guide portions 192, 262, 191, 142 guide the guided portions 281-284 using interlock structure of the protrusions 281b-284b and the grooves 281a-284a as shown in FIGS. 17, 18. However, this is just an example. The guide portions 192, 262, 191, 142 may guide the guided portions 281-284 using another structure other than interlock structure.

For example, some or all of the guide portions 192, 262, 191, 142 may not have the protrusions 281b-284b and the grooves 281a-284a. The same applies to the guided portions 281-284.

(9) In the above-described sixth embodiment, when both the two opening hole covers 14, 26 are removed from the case body 13, the first case opening hole 13a and the second case opening hole 13b form one continuous opening as shown in FIG. 14. However, this is just an example. The first case opening hole 13a and the second case opening hole 13b may be openings separately formed in the case body 13.

(10) In the above-described eighth embodiment shown in FIG. 22, multiple protrusion side protrusions 285 are formed at predetermined intervals throughout the first to fourth guided portions 281, 282, 283, 284. However, this is just an example.

For example, the protrusion side protrusion 285 may be provided in some of the first to fourth protrusions 281b-284b instead of all of them. Further, the protrusion side protrusions 285 may be formed only in a part of each first to fourth guided portions 281, 282, 283, 284. The protrusion side protrusions 285 may be continuously connected instead of being provided at predetermined intervals. The same applies to the protrusion side protrusion 285 and the groove side protrusion 286 shown in FIGS. 23 to 28.

(11) In the above-described tenth embodiment, the protrusion side protrusion 285 shown in FIG. 24 is pressed by the corner part of the first groove defining portion 281*d*. For example, the first groove defining portion 281*d* may have an inclined surface inclined with respect to the fan axial direction DRa, and the protrusion side protrusion 285 may be pressed by the inclined surface. Even by this configuration, the protrusion side protrusion 285 is pressed by the first groove defining portion 281*d* in the fan axial direction DRa and the direction perpendicular to the fan axis CL1. This is the same for the groove side protrusion 286 shown in FIG. 25, for example.

(12) In the above-described fifteenth embodiment, the cover fixation member for fixing the opening hole covers 14, 26 to the case body 13 is the screw 203 as shown in FIG. 29. However, the cover fixation member is not limited to the screw 203. For example, the cover fixation member may be a bolt, a holder spring, a protruding edge or the like. This is the same for the cover fixing member of the sixteenth embodiment.

(13) Note that the present disclosure is not limited to the embodiment described above, and can be variously modified. The above embodiments are not independent of each other, and can be appropriately combined together except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like.

A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

CONCLUSION

According to a first aspect described in some or all of the above-described embodiment, the air-conditioning includes the case body that has the case opening hole located outward of the blower in the radial direction of the fan axis and opens in the radial direction. The air-conditioning case includes the opening hole cover that is fixed to the case body to close the case opening hole. The opening hole cover is detachable from the case body. The case opening hole has a size that allows the blower to pass through the case opening hole when the blower is taken out from the air-conditioning case.

According to a second aspect, the opening hole cover is joined to the blower. The blower is removable from the case body integrally with the opening hole cover. Accordingly, when replacing the blower, the blower can be taken out from the air-conditioning case by detaching the opening hole cover from the case body.

According to a third aspect, the opening hole cover can be detached from the case body independently from the blower. When the opening hole cover is removed from the case body, the blower can be taken out from the air-conditioning case. Accordingly, since the blower is not required to be supported by the opening hole cover in the air-conditioning case, the blower is easily supported.

According to a fourth aspect, the fan cover has the detachable portion that is fixed to the opening hole cover and is integrally detachable with the opening hole cover from the case body. The detachable portion includes a part of the fan cover that overlaps the projected area of the blower fan projected in the radial direction toward the case opening hole. Accordingly, in a case where the blower fan is a centrifugal fan, the fan cover can be provided so as not to interfere with the replacement of the blower.

According to a fifth aspect, a projected area of the blower projected in the radial direction toward the case opening hole is in the case opening hole, and thereby the case opening hole has the size that allows the blower to pass through the case opening hole when the blower is taken out from the air-conditioning case. Accordingly, the case opening hole is large enough that the blower passes therethrough when the blower is taken out from the air-conditioning case. Accordingly, the blower can be easily taken out of the air-conditioning case in the radial direction.

According to a sixth aspect, the blower is detachable from the air-conditioning case in the first radial direction that is one of the radial direction through the first case opening hole after the first opening hole cover is detached from the case body. The blower is detachable from the air-conditioning case in a second radial direction that is one of the radial direction other than the first radial direction through the second case opening hole after the second opening hole cover is detached from the case body.

Accordingly, when replacing the blower in the vehicle on which the vehicular air-conditioning unit is mounted, and when the components around the vehicular air-conditioning unit interfere with the replacement of the blower in the first radial direction, the blower can be detached in the second radial direction. Conversely, when the components around the vehicular air-conditioning unit interfere with the replacement of the blower in the second radial direction, the blower can be detached in the first radial direction. As described above, since the blower can be detached along multiple directions, one type of the vehicular air-conditioning unit from which the blower can be taken out can be installed into various vehicles. Since the number of types of the vehicular air-conditioning unit is limited, the manufacturing steps and the management processes can be reduced.

According to a seventh aspect, the blower has the motor fixation portion. The motor fixation portion has the first guided portion and the second guided portion extending in the first radial direction in parallel with each other. The air-conditioning case includes the first guide portion that is fixed to a part of the air-conditioning case other than the first opening hole cover and extends in the first radial direction along the first guided portion. The air-conditioning case includes the second guide portion that is fixed to a part of the air-conditioning case other than the first opening hole cover and extends in the first radial direction along the second guided portion. That is, when the blower is taken out from the air-conditioning case in the first radial direction, the first guided portion is guided by the first guide portion, and the second guided portion is guided by the second guide portion as the blower moves in the first radial direction.

Accordingly, the blower can be easily moved along a direction in which the blower is taken out when the blower is taken out in the first radial direction. Accordingly, workability of the replacement of the blower can be improved.

According to an eighth aspect, the blower fan draws the air from the first side in the axial direction of the fan axis by rotating about the fan axis. The motor fixation portion is located on the second side of the blower in the axial direction. The second side is opposite to the first side. The motor fixation portion has the through-hole through which the air blown out from the blower fan flows. Accordingly, the first guided portion can be arranged such that the motor fixation portion does not block the airflow from the blower fan.

According to a ninth aspect, one of the first guided portion or the first guide portion has the first groove that is recessed in a direction intersecting the fan axis and extends in the first radial direction, and another of the first guided portion or the first guide portion has the first protrusion fitted into the first groove. One of the second guided portion or the second guide portion has the second groove that is recessed in a direction intersecting the fan axis and extends in the first radial direction, and another of the second guided portion or the second guide portion has the second protrusion fitted into the first groove. When the first guided portion is guided by the first guide portion as the blower moves in the first radial direction, the first guided portion moves in the first radial direction relative to the first guide portion with the first protrusion fitted into the first groove. When the second guided portion is guided by the second guide portion as the blower moves in the first radial direction, the second guided portion moves in the first radial direction relative to the second guide portion with the second protrusion fitted into the second groove.

Accordingly, when replacing the blower by removing the first opening hole cover, the blower can be guided along the first radial direction with the blower immovable in the fan axial direction.

According to a tenth aspect, the groove side protrusion partially protruding from a wall surface of a predetermined groove that is at least one of the first groove or the second groove is provided. The groove side protrusion is pressed by the predetermined protrusion that is at least one of the first protrusion or the second protrusion fitted into the predetermined groove. Accordingly, the groove side protrusions limit a relative motion of the blower to the case body, and thereby noise and vibration wear can be limited. As a result, it is possible to prevent the occupant from being uncomfortable due to the noise and vibration.

According to an eleventh aspect, the groove side protrusion is pressed by the predetermined protrusion in a direction perpendicular to the fan axis, or in the axial direction of the fan axis and the direction perpendicular to the fan axis. Accordingly, when the groove side protrusion is pressed in the direction perpendicular to the fan axis, the groove side protrusion limits a motion of the blower in the direction perpendicular to the fan axis. When the groove side protrusion is pressed in the axial direction and the direction perpendicular to the fan axis, the groove side protrusion limits a motion of the blower in the axial direction and the direction perpendicular to the fan axis.

According to a twelfth aspect, the protrusion side protrusion partially protruding from the predetermined protrusion or the lateral side of the predetermined protrusion, the predetermined protrusion being at least one of the first protrusion or the second protrusion. The protrusion side protrusion is pressed by the predetermined groove defining portion that defines the predetermined groove, the predetermined groove being at least one of the first groove or the second groove into which the predetermined protrusion is fitted. Therefore, it is possible to suppress rattling of the blower, similarly to the function and effect of the groove side protrusion in the tenth aspect.

According to a thirteenth aspect, the protrusion side protrusion is pressed by the predetermined groove defining portion in a direction perpendicular to the fan axis, or in the axial direction of the fan axis and the direction perpendicular to the fan axis. Therefore, it is possible to suppress rattling of the blower in the direction in which the protrusion side protrusion is pressed, similarly to the function and effect of the groove side protrusion in the tenth aspect.

According to a fourteenth aspect, the air-conditioning case includes the cover fixation portion. The first opening hole cover is fixed to the case body or the blower by the cover fixation portion. Accordingly, the first opening hole cover is prevented from unintentionally being detached, and rattles between the blower and the first opening hole cover can be suppressed.

According to a fifteenth aspect, the second radial direction is perpendicular to the first radial direction.

What is claimed is:

1. A vehicular air conditioning unit comprising:
an air-conditioning case that defines therein a case passage through which an air flows; and
a blower that has
  a blower fan accommodated in the air-conditioning case and configured to rotate about a fan axis to cause the air to flow through the case passage, and
  a blower motor accommodated in the air-conditioning case and configured to rotate the blower fan, wherein
the air-conditioning case includes
  a case body having a first case opening hole and a second case opening hole each of which is located outward of the blower in a radial direction of the fan axis and opens in the radial direction,
  a first opening hole cover fixed to the case body to close the first case opening hole, and
  a second opening hole cover fixed to the case body to close the second case opening hole,
the first case opening hole has a size that allows the blower to pass through the first case opening hole when the blower is taken out from the air-conditioning case,
the second case opening hole has a size that allows the blower to pass through the second case opening hole when the blower is taken out from the air-conditioning case,
the first opening hole cover is detachable from the case body independently from the second opening hole cover and the blower,
the second opening hole cover is detachable from the case body independently from the first opening hole cover and the blower,
the blower is detachable from the air-conditioning case in a first radial direction that is one of the radial direction through the first case opening hole after the first opening hole cover is detached from the case body, and
the blower is detachable from the air-conditioning case in a second radial direction that is one of the radial direction other than the first radial direction through the second case opening hole after the second opening hole cover is detached from the case body.

2. The vehicular air conditioning unit according to claim 1, wherein the blower motor includes a non-rotatable portion that is not rotatable, the blower includes a motor fixation portion to which the non-rotatable portion is fixed, the motor fixation portion has a first guided portion and a second guided portion extending in the first radial direction in parallel with each other, the air-conditioning case has
- a first guide portion that is fixed to a part of the air-conditioning case other than the first opening hole and extends in the first radial direction along the first guided portion, and
- a second guide portion that is fixed to a part of the air-conditioning case other than the first opening hole cover and extends in the first radial direction along the second guided portion, when the blower is taken out from the air-conditioning case in the first radial direction, the first guided portion is guided by the first guide portion, and the second guided portion is guided by the second guide portion as the blower moves in the first radial direction.

3. The vehicular air conditioning unit according to claim 2, wherein the blower fan is configured to draw the air from a first side in the axial direction by rotating about the fan axis, the motor fixation portion is located on a second side of the blower fan in the axial direction, the second side being opposite to the first side in the axial direction, and the motor fixation portion has a through-hole through which the air blown out from the blower fan flows.

4. The vehicular air conditioning unit according to claim 2, wherein one of the first guided portion or the first guide portion has a first groove that is recessed in a direction intersecting the fan axis and extends in the first radial direction, another of the first guided portion or the first guide portion has a first protrusion fitted into the first groove, one of the second guided portion or the second guide portion has a second groove that is recessed in a direction intersecting the fan axis and extends in the first radial direction, another of the second guided portion or the second guide portion has a second protrusion fitted into the second groove, when the first guided portion is guided by the first guide portion as the blower moves in the first radial direction, the first guided portion moves in the first radial direction relative to the first guide portion with the first protrusion fitted into the first groove, and when the second guided portion is guided by the second guide portion as the blower moves in the first radial direction, the second guided portion moves in the first radial direction relative to the second guide portion with the second protrusion fitted into the second groove.

5. The vehicular air conditioning unit according to claim 4, further comprising:

a groove side protrusion partially protruding from a wall surface of a predetermined groove that is at least one of the first groove or the second groove, wherein the groove side protrusion is pressed by a predetermined protrusion that is at least one of the first protrusion or the second protrusion fitted into the predetermined groove.

6. The vehicular air conditioning unit according to claim 5, wherein the groove side protrusion is pressed by the predetermined protrusion in a direction perpendicular to the fan axis, or in the axial direction of the fan axis and the direction perpendicular to the fan axis.

7. The vehicular air conditioning unit according to claim 4, further comprising:

a protrusion side protrusion partially protruding from a predetermined protrusion or a lateral side of the predetermined protrusion, the predetermined protrusion being at least one of the first protrusion or the second protrusion, wherein the protrusion side protrusion is pressed by a predetermined groove defining portion that defines a predetermined groove, the predetermined groove being at least one of the first groove or the second groove into which the predetermined protrusion is fitted.

8. The vehicular air conditioning unit according to claim 7, wherein the protrusion side protrusion is pressed by the predetermined groove defining portion in a direction perpendicular to the fan axis, or in the axial direction of the fan axis and the direction perpendicular to the fan axis.

9. The vehicular air conditioning unit according to claim 1, wherein the air-conditioning case includes a cover fixation portion, and the first opening hole cover is fixed to the case body or the blower by the cover fixation portion.

10. The vehicular air conditioning unit according to claim 1, wherein the second radial direction is perpendicular to the first radial direction.

\* \* \* \* \*